(12) United States Patent
Abedini et al.

(10) Patent No.: US 10,701,667 B2
(45) Date of Patent: Jun. 30, 2020

(54) PAGING TECHNIQUES IN A WIRELESS BACKHAUL NETWORK

(71) Applicant: QUALCOMM Incorporated, San Diego, CA (US)

(72) Inventors: Navid Abedini, Somerset, NJ (US); Muhammad Nazmul Islam, Littleton, MA (US); Jianghong Luo, Skillman, NJ (US); Hong Cheng, Bridgewater, NJ (US); Junyi Li, Chester, NJ (US); Karl Georg Hampel, Hoboken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/375,820

(22) Filed: Apr. 4, 2019

(65) Prior Publication Data

US 2019/0313369 A1   Oct. 10, 2019

Related U.S. Application Data

(60) Provisional application No. 62/655,164, filed on Apr. 9, 2018.

(51) Int. Cl.
*H04W 68/08* (2009.01)
*H04W 68/02* (2009.01)
(Continued)

(52) U.S. Cl.
CPC ........... *H04W 68/08* (2013.01); *H04W 8/005* (2013.01); *H04W 48/16* (2013.01);
(Continued)

(58) Field of Classification Search
CPC ..... H04W 68/08; H04W 68/02; H04W 48/16; H04W 72/1242; H04W 64/003;
(Continued)

(56) References Cited

U.S. PATENT DOCUMENTS 8,818,427 B1   8/2014   Goyal et al.
9,425,944 B1   8/2016   Singh et al.
(Continued)

OTHER PUBLICATIONS

International Search Report and Written Opinion—PCT/US2019/025974—ISA/EPO—dated Jun. 5, 2019.
(Continued)

*Primary Examiner* — Chuong A Ngo
(74) *Attorney, Agent, or Firm* — Holland & Hart LLP

(57) ABSTRACT

Methods, systems, and devices for wireless communications are described that provide a mechanism for a wireless node to identify resources that are controlled by a different wireless node in the wireless backhaul communications network and in some cases autonomously transmit certain transmissions using resources of the different wireless node. A first wireless node may receive signaling that indicates whether such transmissions may be autonomously transmitted via configuration information or a flag provided in signaling to the first wireless node. The first wireless node may in some cases determine that autonomous transmissions are enabled based on a type of communication or node that provides the information for the transmissions from the first wireless node. In some cases, a priority associated with the transmissions may be used to determine whether autonomous transmissions are enabled.

30 Claims, 19 Drawing Sheets

(51) Int. Cl.
*H04W 48/16* (2009.01)
*H04W 72/12* (2009.01)
*H04W 64/00* (2009.01)
*H04W 8/00* (2009.01)
*H04W 76/28* (2018.01)

(52) U.S. Cl.
CPC ......... *H04W 64/003* (2013.01); *H04W 68/02* (2013.01); *H04W 72/1242* (2013.01); *H04W 76/28* (2018.02)

(58) Field of Classification Search
CPC ..... H04W 8/005; H04W 76/28; H04W 88/08; H04W 68/12; H04W 68/005
See application file for complete search history.

(56) References Cited

U.S. PATENT DOCUMENTS 9,510,287 B2 * 11/2016 Lu ..................... H04W 52/0225
9,565,573 B2 *  2/2017 Mukherjee ............ H04W 88/04

OTHER PUBLICATIONS

Zte, et al., "IAB Enhancements Overview", 3GPP TSG RAN WG1 Meeting #92bis, 3GPP Draft; R1-1804505 IAB Enhancements Overview, 3rd Generation Partnership Project (3GPP), Mobile Competence Centre, 650, Route Des Lucioles; F-06921 Sophia-Antipolis Cedex; France, vol. RAN WG1, No. Sanya, China; 20180416-20180420, Apr. 7, 2018 (Apr. 7, 2018), pp. 1-3, XP051413928, Retrieved from the Internet: URL: http://www.3gpp.org/ftp/tsg%5Fran/WG1%5FRL1/TSGR1%5F92b/Docs/ [retrieved on Apr. 7, 2018] Chapter 2.

* cited by examiner

PAGING TECHNIQUES IN A WIRELESS BACKHAUL NETWORK

CROSS REFERENCES

The present application for patent claims the benefit of U.S. Provisional Patent Application No. 62/655,164 by ABEDINI, et al., entitled "PAGING TECHNIQUES IN A WIRELESS BACKHAUL NETWORK," filed Apr. 9, 2018, assigned to the assignee hereof, and expressly incorporated herein.

BACKGROUND

The following relates generally to wireless communication, and more specifically to paging techniques in a wireless backhaul network.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may rely on backhaul networks to exchange information between nodes (e.g., between base stations or between a base station and a core network). The backhaul networks may be used to communicate user plane traffic and/or control plane traffic. Some backhaul networks may be wired, may be wireless, or may include a mix of wired and wireless links. A wireless backhaul network may include some or all of the wireless nodes (e.g., base stations and/or UE) being configured with an access node function (ANF) and/or a UE function (UEF) that controls, monitors, or otherwise manages aspect(s) of the wireless backhaul network.

Such wireless backhaul networks may include different sets of resources (e.g., any one or combination of time, frequency, space, code, etc., resources) being allocated to different nodes. For example, a different subset of a set of resources may be allocated to different subset of nodes of the wireless backhaul network for access and/or backhaul communications. Partitioning the resources in such a manner may minimize interference, but may be costly with respect to such resources and/or may minimize which nodes are able to communicate with each other. This may delay traffic between such nodes.

SUMMARY

The described techniques relate to improved methods, systems, devices, or apparatuses that support paging resource allocation in a wireless backhaul network. Generally, the described techniques provide a mechanism for a wireless node (e.g., a base station in a wireless backhaul communications network) to identify resources that are controlled by a different wireless node in the wireless backhaul communications network and, in some cases, autonomously transmit certain transmissions using resources of the different wireless node. For example, the first wireless node may receive an indication to transmit a paging message, and may determine a set of paging resources for transmission of the paging message (e.g., by one or more parameters associated with the paging message). In some cases, the first wireless node may have control over certain wireless resources, and a second wireless node may have control over the set of paging resources. In some cases, the first wireless node may determine that the paging message is to be autonomously transmitted (e.g. to a user equipment (UE)) and may autonomously transmit the paging message via the set of paging resources.

In some cases, the first wireless node may receive signaling that indicates whether such transmissions may be autonomously transmitted. For example, a flag may be set in signaling to the first wireless node that indicates whether autonomous transmissions are enabled. In some cases, the first wireless node may determine that autonomous transmissions are enabled based on a type of communication (e.g., a core network (CN) page versus a radio access network (RAN) page) or node that provides the information for the transmissions from the first wireless node (e.g., autonomous transmissions may be enabled when an access and mobility function (AMF) indicates the transmissions, and may be disabled when another wireless node indicates the transmissions to the first wireless node). In some cases, when autonomous transmissions via another wireless node's resources are disabled, the first wireless node may transmit a resource request to the second wireless node. The second wireless node may determine a resource configuration for the first wireless node that includes available resources (e.g., any one or combination of time, frequency, space, and code) that the first wireless node can use.

The second wireless node may transmit a response message that carries, conveys, or otherwise identifies the available resources for use at the first wireless node. In some cases, the transmission of the first wireless node may have an associated priority, and the second wireless node may refrain from transmissions on resources to be used by the first wireless node based on the priority in comparison to a priority of transmissions of the second wireless node that would otherwise use the wireless resources.

A method of wireless communication is described. The method may include receiving, at a first wireless node in a wireless backhaul communications network, an indication of a set of wireless resources that are available for autonomous transmission of one or more paging messages to one or more other wireless nodes, the set of wireless resources controlled by a second wireless node, determining that a paging message is to be transmitted to a third wireless node, and autonomously transmitting, based at least in part on the indication, the paging message to the third wireless node via the set of wireless resources controlled by the second wireless node.

An apparatus for wireless communication is described. The apparatus may include means for receiving, at a first wireless node in a wireless backhaul communications network, an indication of a set of wireless resources that are available for autonomous transmission of one or more paging messages to one or more other wireless nodes, the set of wireless resources controlled by a second wireless node, means for determining that a paging message is to be transmitted to a third wireless node, and means for autonomously transmitting, based at least in part on the indication, the paging message to the third wireless node via the set of wireless resources controlled by the second wireless node.

Another apparatus for wireless communication is described. The apparatus may include a processor, memory coupled with the processor, and instructions stored in the memory. The instructions may be operable to cause the processor to receive, at a first wireless node in a wireless backhaul communications network, an indication of a set of wireless resources that are available for autonomous transmission of one or more paging messages to one or more other wireless nodes, the set of wireless resources controlled by a second wireless node, determine that a paging message is to be transmitted to a third wireless node, and autonomously transmit, based at least in part on the indication, the paging message to the third wireless node via the set of wireless resources controlled by the second wireless node.

A non-transitory computer-readable medium for wireless communication is described. The non-transitory computer-readable medium may include instructions operable to cause a processor to receive, at a first wireless node in a wireless backhaul communications network, an indication of a set of wireless resources that are available for autonomous transmission of one or more paging messages to one or more other wireless nodes, the set of wireless resources controlled by a second wireless node, determine that a paging message is to be transmitted to a third wireless node, and autonomously transmit, based at least in part on the indication, the paging message to the third wireless node via the set of wireless resources controlled by the second wireless node.

In some examples of the method, apparatus, and non-transitory computer-readable medium described above, the receiving may include receiving signaling that indicates that the paging message is to be transmitted to the third wireless node, the signaling indicating the set of wireless resources may be available for autonomous transmission of the paging message. In some examples of the method, apparatus, and non-transitory computer-readable medium described above, the signaling comprises a paging request received from a network entity of the wireless backhaul communications network according to a CN paging mode, or from a fourth wireless node of the wireless backhaul communications network according to a RAN paging mode. In some examples of the method, apparatus, and non-transitory computer-readable medium described above, the signaling comprises a paging request that provides information on one or more of a user equipment identification (UE-ID) for a UE to be paged, discontinuous reception (DRX) cycle information for the UE, a number of paging frames, a number of paging opportunities, or any combinations thereof, from which the set of wireless resources that may be available for autonomous transmission can be inferred. In some examples of the method, apparatus, and non-transitory computer-readable medium described above, the signaling includes a priority indicator associated with the paging message, and wherein the transmitting the paging message may be further based at least in part on the priority indicator.

Some examples of the method, apparatus, and non-transitory computer-readable medium described above may further include processes, features, means, or instructions for determining that autonomous transmission of at least one other paging message may be unavailable, the at least one other paging message to be transmitted to a fourth wireless node via the set of wireless resources controlled by the second wireless node. Some examples of the method, apparatus, and non-transitory computer-readable medium described above may further include processes, features, means, or instructions for transmitting a request message to the second wireless node indicating that resources may be requested at the first wireless node. Some examples of the method, apparatus, and non-transitory computer-readable medium described above may further include processes, features, means, or instructions for receiving an indication of available resources from the second wireless node. Some examples of the method, apparatus, and non-transitory computer-readable medium described above may further include processes, features, means, or instructions for transmitting the at least one other paging message to the fourth wireless node via the indicated available resources.

In some examples of the method, apparatus, and non-transitory computer-readable medium described above, the determining that autonomous transmission of the at least one other paging message is unavailable may be based at least in part on a flag provided with a paging request. In some examples of the method, apparatus, and non-transitory computer-readable medium described above, the indication that the set of wireless resources are available for autonomous transmission of the one or more paging messages may be a second request message transmitted by another wireless node indicating that resources are requested for the paging message.

Some examples of the method, apparatus, and non-transitory computer-readable medium described above may further include processes, features, means, or instructions for determining that the set of wireless resources are available for autonomous transmission of the one or more paging messages when a paging request is received from a network entity of a CN according to a CN paging mode. In some examples of the method, apparatus, and non-transitory computer-readable medium described above, the determining that autonomous transmission of the at least one other paging message is unavailable may be based on at least one other paging request received from another wireless node of the wireless backhaul communications network according to a RAN paging mode.

Some examples of the method, apparatus, and non-transitory computer-readable medium described above may further include processes, features, means, or instructions for forwarding the indication of the set of wireless resources that are available for autonomous transmission of the one or more paging messages to at least a fourth wireless node of the wireless backhaul communications network. In some examples of the method, apparatus, and non-transitory computer-readable medium described above, the indication may be for a page to a user equipment in a tracking area (TA) of the first wireless node, and may be forwarded to the fourth wireless node in the TA via one or more intermediary wireless nodes of the wireless backhaul communications network. Some examples of the method, apparatus, and non-transitory computer-readable medium described above may further include processes, features, means, or instructions for receiving information identifying at least the third wireless node and a TA associated with the third wireless node, wherein the first wireless node may be part of the TA.

In some examples of the method, apparatus, and non-transitory computer-readable medium described above, the information further identifies that at least the second wireless node is part of the TA, and wherein the autonomous transmission of the paging message may be based at least in part on the first wireless node and the second wireless node being part of the TA. In some examples of the method, apparatus, and non-transitory computer-readable medium described above, the information further identifies that at least a fourth wireless node is not part of the TA, and a request for resources may be transmitted to the fourth wireless node for transmission of the one or more paging messages. In some examples of the method, apparatus, and non-transitory computer-readable medium described above, the information may be received as part of a paging request received at the first wireless node or in one or more configuration messages received at the first wireless node.

A method of wireless communication is described. The method may include determining that a paging message is to be transmitted by a first wireless node in a wireless backhaul communications network, identifying a set of wireless resources for transmission of the paging message to a second wireless node and a third wireless node in the wireless backhaul communications network, wherein the second wireless node in the wireless backhaul communications network controls resources that include the set of wireless resources for transmission of the paging message to the third wireless node, and transmitting, to the first wireless node and the second wireless node, an indication of the set of wireless resources and that the set of wireless resources are available for autonomous transmission of the paging message by the first wireless node.

An apparatus for wireless communication is described. The apparatus may include means for determining that a paging message is to be transmitted by a first wireless node in a wireless backhaul communications network, means for identifying a set of wireless resources for transmission of the paging message to a second wireless node and a third wireless node in the wireless backhaul communications network, wherein the second wireless node in the wireless backhaul communications network that controls resources that include the set of wireless resources for transmission of the paging message to the third wireless node, and means for transmitting, to the first wireless node and the second wireless node, an indication of the set of wireless resources and that the set of wireless resources are available for autonomous transmission of the paging message by the first wireless node.

Another apparatus for wireless communication is described. The apparatus may include a processor, memory coupled with the processor, and instructions stored in the memory. The instructions may be operable to cause the processor to determine that a paging message is to be transmitted by a first wireless node in a wireless backhaul communications network, identify a set of wireless resources for transmission of the paging message to a second wireless node and a third wireless node in the wireless backhaul communications network, wherein the second wireless node in the wireless backhaul communications network controls resources that include the set of wireless resources for transmission of the paging message to the third wireless node, and transmit, to the first wireless node and the second wireless node, an indication of the set of wireless resources and that the set of wireless resources are available for autonomous transmission of the paging message by the first wireless node.

A non-transitory computer-readable medium for wireless communication is described. The non-transitory computer-readable medium may include instructions operable to cause a processor to determine that a paging message is to be transmitted by a first wireless node in a wireless backhaul communications network, identify a set of wireless resources for transmission of the paging message to a second wireless node and a third wireless node in the wireless backhaul communications network, wherein the second wireless node in the wireless backhaul communications network controls resources that include the set of wireless resources for transmission of the paging message to the third wireless node, and transmit, to the first wireless node and the second wireless node, an indication of the set of wireless resources and that the set of wireless resources are available for autonomous transmission of the paging message by the first wireless node.

In some examples of the method, apparatus, and non-transitory computer-readable medium described above, the identifying the second wireless node in the wireless backhaul communications network comprises identifying a plurality of wireless nodes that may have overlapping coverage areas with the first wireless node, and the indication of the set of wireless resources is transmitted to each of the identified plurality of wireless nodes that may have overlapping coverage areas with the first wireless node. In some examples of the method, apparatus, and non-transitory computer-readable medium described above, the method may be performed by an AMF or another wireless node of the wireless backhaul communications network.

In some examples of the method, apparatus, and non-transitory computer-readable medium described above, the indication comprises a paging request that indicates that the paging message is to be transmitted to the UE, the paging request including a flag that indicates whether the set of wireless resources are available for autonomous transmission of the paging message. In some examples of the method, apparatus, and non-transitory computer-readable medium described above, the indication provides the second wireless node with information that the set of wireless resources is to be unused for transmissions by the second wireless node. In some examples of the method, apparatus, and non-transitory computer-readable medium described above, the indication of the set of wireless resources may be transmitted to one or more of the first wireless node or the second wireless node via one or more intermediary wireless nodes of the wireless backhaul communications network. Some examples of the method, apparatus, and non-transitory computer-readable medium described above may further include processes, features, means, or instructions for transmitting information identifying a plurality of wireless nodes within a TA of the third wireless node to each of the first wireless node and the second wireless node. In some examples of the method, apparatus, and non-transitory computer-readable medium described above, the indication includes a priority indicator associated with the paging message, the priority indicator usable by the second wireless node to determine that the set of wireless resources are to be unused for transmissions by the second wireless node.

A method of wireless communication is described. The method may include receiving, at a second wireless node in a wireless backhaul communications network, an indication of a set of wireless resources for autonomous transmission of a paging message from a first wireless node to one or more other wireless nodes, the set of wireless resources controlled by the second wireless node, determining, based at least in part on the received indication, that the set of wireless resources are to be unused for communications by the second wireless node, and refraining for communicating via the set of wireless resources based at least in part on the determining.

An apparatus for wireless communication is described. The apparatus may include means for receiving, at a second wireless node in a wireless backhaul communications network, an indication of a set of wireless resources for autonomous transmission of a paging message from a first wireless node to one or more other wireless nodes, the set of wireless resources controlled by the second wireless node, means for determining, based at least in part on the received indication, that the set of wireless resources are to be unused for communications by the second wireless node, and means for refraining for transmitting via the set of wireless resources based at least in part on the determining.

Another apparatus for wireless communication is described. The apparatus may include a processor, memory coupled with the processor, and instructions stored in the memory. The instructions may be operable to cause the processor to receive, at a second wireless node in a wireless backhaul communications network, an indication of a set of wireless resources for autonomous transmission of a paging message from a first wireless node to one or more other wireless nodes, the set of wireless resources controlled by the second wireless node, determine, based at least in part on the received indication, that the set of wireless resources are to be unused for communications by the second wireless node, and refrain for communicating via the set of wireless resources based at least in part on the determining.

A non-transitory computer-readable medium for wireless communication is described. The non-transitory computer-readable medium may include instructions operable to cause a processor to receive, at a second wireless node in a wireless backhaul communications network, an indication of a set of wireless resources for autonomous transmission of a paging message from a first wireless node to one or more other wireless nodes, the set of wireless resources controlled by the second wireless node, determine, based at least in part on the received indication, that the set of wireless resources are to be unused for communications by the second wireless node, and refrain for communicating via the set of wireless resources based at least in part on the determining.

In some examples of the method, apparatus, and non-transitory computer-readable medium described above, the indication includes a priority indicator associated with the paging message. Some examples of the method, apparatus, and non-transitory computer-readable medium described above may further include processes, features, means, or instructions for comparing a first priority of the paging message relative to a second priority of one or more other transmissions of the second wireless node associated with the set of wireless resources. In some examples of the method, apparatus, and non-transitory computer-readable medium described above, the refraining from transmitting via the set of wireless resources may be based at least in part on the comparing.

In some examples of the method, apparatus, and non-transitory computer-readable medium described above, the indication may be received from an AMF or another wireless node of the wireless backhaul communications network. In some examples of the method, apparatus, and non-transitory computer-readable medium described above, the indication may be received in a paging request that indicates that the paging message is to be transmitted to a UE, the paging request including a flag that indicates whether the set of wireless resources are to be available for autonomous transmission of the paging message.

DETAILED DESCRIPTION

Figure 1:
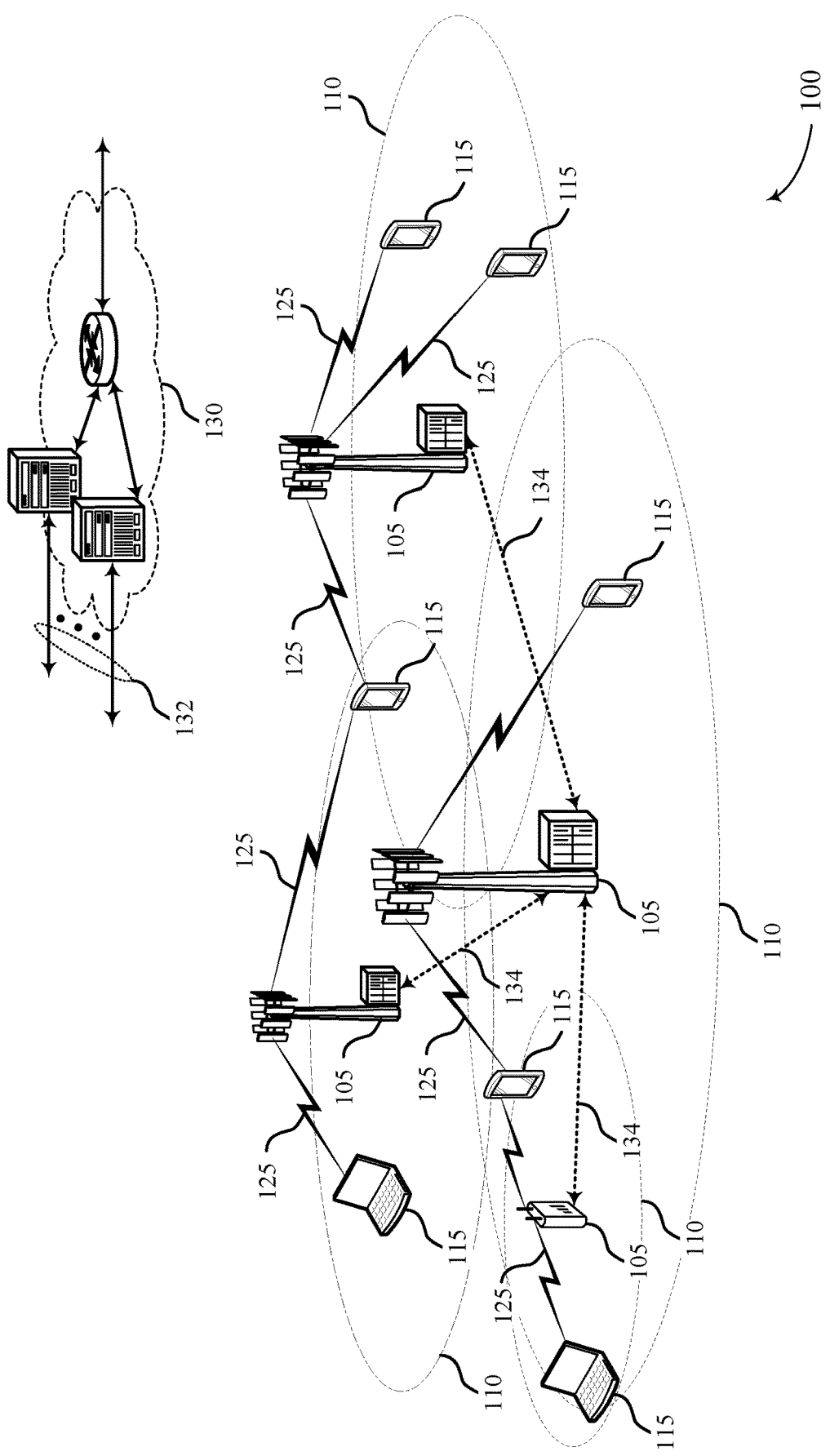
FIG. 1 illustrates an example of a system for wireless communication that supports paging techniques in a wireless backhaul network in accordance with aspects of the present disclosure.

Various aspects of the present disclosure provide for identification and autonomous use of resources for certain communications in a wireless communications system. In some aspects, a number of wireless nodes may be configured in a wireless backhaul communications network (e.g., in an integrated access and backhaul (TAB) wireless communications system) in which certain nodes may have control over certain resources. In some cases, a first wireless node (e.g., a base station in the wireless backhaul communications network) may identify resources that are controlled by a second wireless node in the wireless backhaul communications network and may autonomously transmit certain transmissions using resources of the second wireless node. For example, the first wireless node may autonomously transmit paging messages using resources controlled by the second wireless node based on certain signaling from another wireless node in the wireless backhaul communications system.

Techniques provided herein may enhance the efficiency of certain wireless communications systems, including systems that use wireless connections between nodes (e.g., base stations) for backhaul communications, as opposed to a wireline link for backhaul communications between nodes. In wireless communications systems that employ wireline links for backhaul communications, a wireless node may enjoy a robust wireline link to a network entity that coordinates aspects of backhaul communications (e.g., the network entity provides timing information, cell identity, etc.) for neighboring nodes to coordinate backhaul transmissions. In some systems, deploying a wireline link to wireless nodes may result in substantial expense and resource expenditure, however. For example, wireless nodes operating in millimeter wave (mmW) frequency ranges may be associated with a reduced coverage area (e.g., a smaller geographic footprint, directional transmissions, etc.), which may result in a deployment of a larger number of access nodes (e.g., wireless nodes) to provide acceptable coverage areas to users. As a result, a number of wireless nodes within the wireless communication system may not be coupled with a wireline backhaul link and may instead use wireless backhaul links for backhaul communications in a wireless backhaul network. However, such a dense deployment of mmW access nodes may be affected by inefficient resource allocation in the absence of techniques that provide coherent wireless resource allocation and scheduling.

Aspects of the disclosure are initially described in the context of a wireless communications system. Generally, aspects of the described techniques provide for resource allocation of certain types of transmissions (e.g., paging messages) between nodes of a wireless backhaul network. For example, two wireless nodes of the wireless backhaul network may have a connection used for access and/or backhaul communications in the wireless backhaul network. In some cases, a first wireless node may have control of certain wireless resources (e.g., wireless resources for a first time domain period), and a second wireless node may have control of other wireless resources (e.g., wireless resources for a second time domain period). The first wireless node may, in some cases, want to transmit using resources controlled by the second wireless node, and various techniques provided herein may allow for transmissions by the first wireless node using resources controlled by the second wireless node. For example, the first wireless node may receive an indication to transmit a paging message, and may determine a set of paging resources for transmission of the paging message (e.g., based on one or more parameters associated with the paging message) are not controlled by the first wireless node. In some cases, the first wireless node may determine that the paging message is to be autonomously transmitted (e.g. to a user equipment (UE)) and may autonomously transmit the paging message via the set of paging resources.

In some cases, the first wireless node may receive signaling that indicates whether such transmissions may be autonomously transmitted. For example, a flag may be set in signaling to the first wireless node that indicated whether autonomous transmissions are enabled. In some cases, the first wireless node may determine that autonomous transmissions are enabled based on a type of communication (e.g., a core network (CN) page versus a radio access network (RAN) page) or node that provides the information for the transmissions from the first wireless node (e.g., autonomous transmissions may be enabled when an access and mobility function (AMF) indicates the transmissions, and may be disabled when another wireless node indicates the transmissions to the first wireless node). The second wireless node may also receive signaling that indicates autonomous transmissions are enabled, and may refrain from transmitting using the set of wireless resources. Additionally or alternatively, the autonomous transmissions may be enabled based on a priority associated with the transmission (e.g., autonomous transmissions may be enabled ultra-reliable low latency communications (URLLC) related transmissions and may be disabled for enhanced mobile broadband (eMBB) related transmissions).

In some cases, when autonomous transmissions via another wireless node's resources are disabled, the first wireless node may transmit a resource request to the second wireless node. The second wireless node may determine a resource configuration for the first wireless node that includes available resources (e.g., any one or combination of time, frequency, space, and code) that the first wireless node can use. The second wireless node may transmit a response message that carries, conveys, or otherwise identifies the available resources for use at the first wireless node. In some cases, the transmission of the first wireless node may have an associated priority, and the second wireless node may refrain from transmissions on resources to be used by the first wireless node based on the priority in comparison to a priority of transmissions of the second wireless node that would otherwise use the wireless resources.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, one or more base stations 105 may identify and autonomously use of resources controlled by another base station 105 for certain communications in a wireless communications system.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology (RAT), or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARM) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR may be expressed in multiples of a basic time unit, which may, for example, refer to a sampling period of Ts=1/30,720,000 seconds. Time intervals of a communications resource may be organized according to radio frames each having a duration of 10 milliseconds (ms), where the frame period may be expressed as $T_f$=307,200 Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, cellular radio access technologies (RATs), such as mmW-based RATs, may be used to support access traffic between UEs 115 and base stations 105, in addition to backhaul and access traffic among multiple base stations 105. Moreover, both access and backhaul traffic may share the same resources (e.g., as in the case of integrated access and backhaul (IAB)). Such wireless backhaul or IAB solutions may be increasingly beneficial with the evolution of cellular technologies due to enhancements in wireless link capacity and reduction in latency. Further, the use of wireless backhaul links may reduce the cost of dense small cell deployments.

Thus, using a mmW RAT may enable wireless backhaul communication using one or more node functions at a wireless node, such as a base station 105, an access node, or UE 115. Additionally, multiple wireless nodes may communicate in a backhaul network using a schedule that is aligned with a frame structure. For example, a wireless node (e.g., UE 115 and/or base station 105) may establish a link with different wireless nodes (e.g., UE 115 and/or base station 105) using a RAT that supports a synchronized frame structure, such as a mmW RAT. The wireless node may identify a need for additional resources for wireless communications with a third wireless node (e.g., based on paging resources identified based on a paging configuration of the third wireless node). The wireless node, in some cases, may receive signaling associated with the additional resources and autonomously transmit the wireless communications to the third wireless node. In some cases, the wireless node may transmit a request message to a second wireless node indicating that resources are requested at the first wireless node. In some cases, signaling may be provided, such as from an access and mobility function (AMF) in the core network 130, that may enable or disable autonomous transmissions in certain situations.

Figure 2:
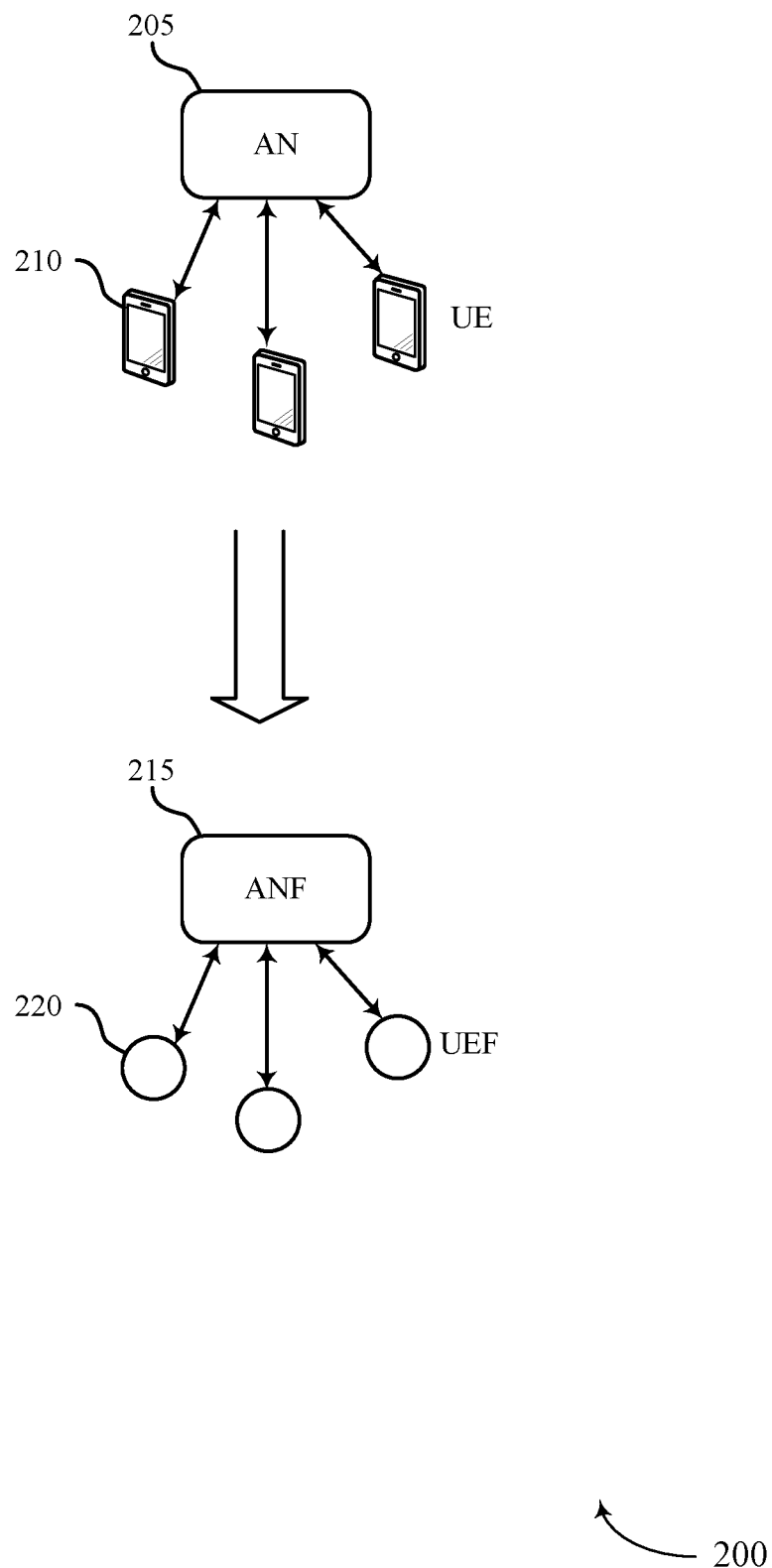
FIG. 2 illustrates an example of a backhaul network that supports paging techniques in accordance with aspects of the present disclosure.

FIG. 2 illustrates an example of a portion of a wireless communication system configured as a backhaul network 200 that supports paging techniques in a wireless backhaul network in accordance with various aspects of the present disclosure. In some examples, backhaul network 200 may implement aspects of wireless communication system 100. Backhaul network 200 may include an access node 205, a plurality of UEs 210, an access node function (ANF) 215, and a plurality of UE functions (UEF) 220, which may be examples of the corresponding devices described herein. That is, AN 205, UE 210, ANF 215, or UEF 220 may be examples of a UE 115 or base station 105, as described herein. For example, a base station may execute an ANF 215 for access communications with a UE 210 or a UEF 220 of another base station, and may also execute a UEF 220 for backhaul communications with a different ANF 215. An access node 205 or UE 210 may also be an example of a wireless node, as described herein.

In backhaul network 200, a number of access nodes 205 (one being shown for clarity) may be interconnected via communication links (e.g., backhaul links) and thus form a given topology with respect to access nodes 205. In such cases, the access node 205 may instantiate one or more node functions to coordinate signaling and resource allocation between the access node 205 and the UEs 210. For example, the access nodes 205 may instantiate one or more ANFs 215, one or more UEFs 220, or any combination thereof.

Access node 205 may be located at a central point of a star, and may be connected to a wireline backhaul link (e.g., an optical fiber cable) to a core network. In some cases, access node 205 may be the only access node in backhaul network 200 that is connected to the wireline backhaul link. Access node 205 may instantiate an ANF 215, and the nodes at the leaves of the star (e.g., UEs 210) may each instantiate a UEF 220. Access node 205 may then communicate with UEs 210 using communication link(s) using the node functions. In some cases, the communication link may be associated with a set of resources that are partitioned into subsets of partitioned resources. The subsets of partitioned resources may be allocated to subsets of the wireless nodes of the backhaul network 200.

The ANFs 215 and the UEFs 220 may be assigned the same functionalities and signaling protocols for resource allocation as defined by a RAT. That is, resource coordination of a backhaul star can be managed via the RAT, such as a 5g or NR mmW RAT. Furthermore, wireless resource use among access nodes 205 within a star may be coordinated via a large-scale (e.g., network-wide) schedule. Within each star, signaling and resource management may be regulated by the RAT and a resource sub-schedule may be generated by a star's ANF (such as the ANF 215 instantiated at access node 205).

In some examples, access node 205 and/or UE 210 may instantiate an ANF 215 in addition to the UEF 220. Access node 205 may accordingly communicate with neighboring access node(s) using communication link according to the node functions. In some cases, ANFs 215 may support transmission of a downlink control channel, reception of an uplink control channel, scheduling of downlink and uplink data transmission within a resource space assigned to a link or to a set of links, transmission of synchronization signals and cell reference signals (e.g., as a primary synchronization symbol (PSS) or secondary synchronization symbol (SSS) on a synchronization channel), transmitting beam sweeps, and transmitting downlink beam change requests. Additionally, UEFs 220 may support reception of a downlink control channel, transmission of an uplink control channel, requesting scheduling of uplink data transmissions, transmission of random access preambles on a random access channel, listening to beam sweeps and reporting beam indexes and beam signal strength detected, and executing downlink beam change requests. In some cases, there may be other features that differentiate the ANF 215 and the UEF 220 implemented at a node. As described above, an access node 205 may implement a combination of one or more node functions, such as multiple ANFs 215, multiple UEFs 220, or combinations thereof.

In some aspects, a wireless node (e.g., a UE 210 and/or access node 205) may identify resources that are controlled by a different wireless node in the wireless backhaul network 200 and may autonomously transmit certain transmissions using resources of the different wireless node. For example, the wireless node may autonomously transmit paging messages using resources controlled by the different wireless node, and a number of techniques for such transmissions will be discussed in more detail below.

Figure 3A:
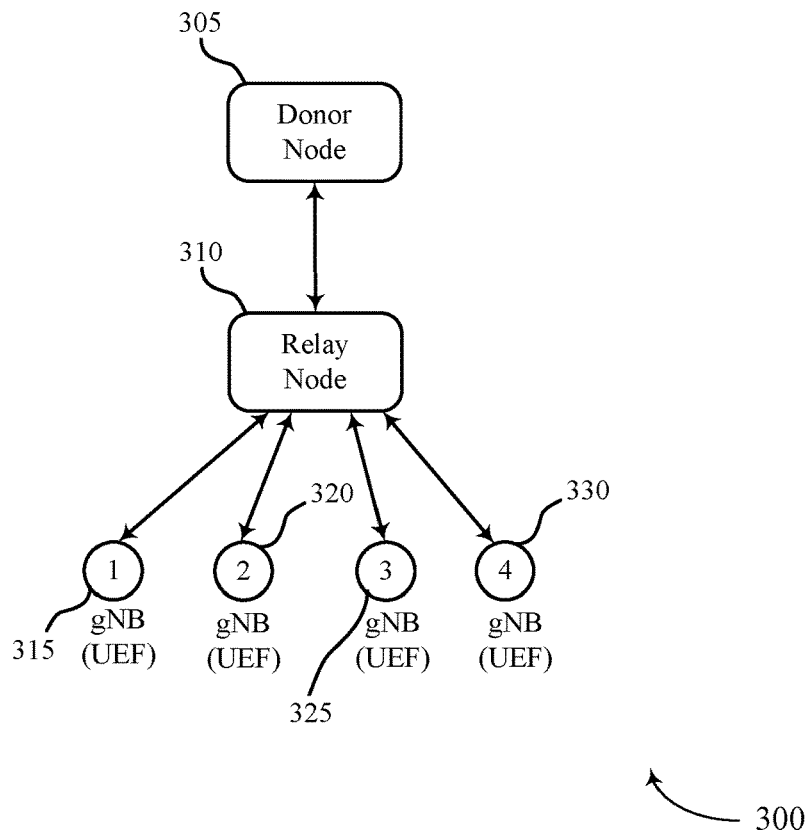
FIG. 3A illustrates an example of a wireless backhaul network that supports paging techniques in in accordance with aspects of the present disclosure.

As indicated above, in some cases resource coordination of a backhaul network may provide that certain wireless nodes control particular wireless resources. FIG. 3A illustrates an example of a wireless backhaul network 300 that supports paging techniques in accordance with various aspects of the present disclosure. In some examples, wireless backhaul network 300 may implement aspects of wireless communication system 100 or 200. In this example, a donor node 305 may be implemented at a wireless node (e.g., a base station or gNB) in a wireless backhaul network 300, and a relay node 310 may be implemented at another wireless node in the wireless backhaul network 300. In this example, the relay node 310 may be in control of resources for a number of UEFs 315, 320, 325, and 330 (e.g., implemented in a base station or gNB). In some examples, the overall time domain resources of wireless backhaul network 300 may be partitioned such as illustrated in FIG. 3B.

Figure 3B:
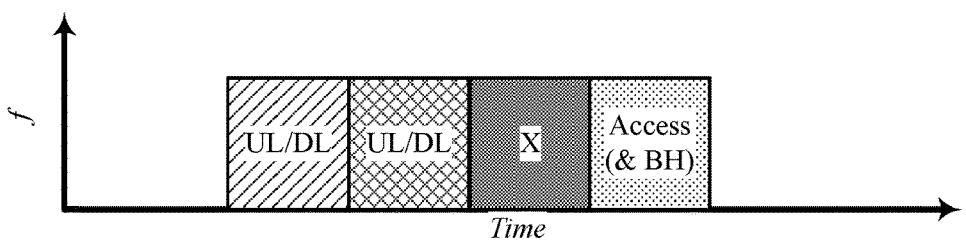
FIG. 3B illustrates an example of a resource partition that supports paging techniques in a wireless backhaul network in accordance with aspects of the present disclosure.
Figure 3B:
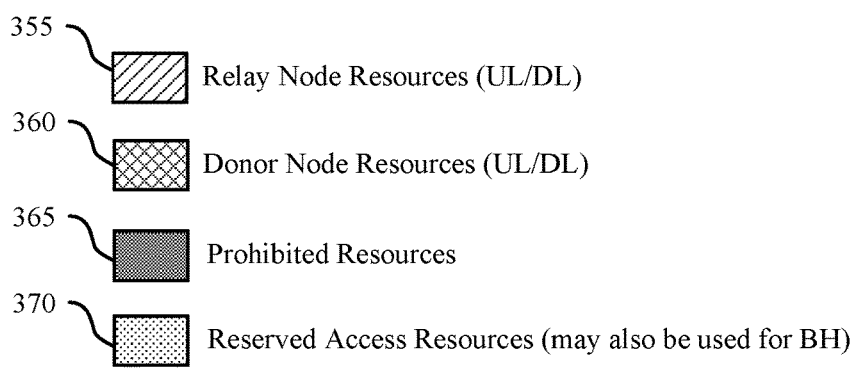

FIG. 3B illustrates an example of a resource partition 350 that supports paging techniques in accordance with various aspects of the present disclosure. In this example, a first partition 355 may provide access-specific resources for the relay node 310, and these resources may be protected for access link purposes, such as for transmissions of synchronization signal blocks (SSBs) by the relay node 310. Thus, relay node 310 may only communicate with donor node 305 via the first partition 355 resources (e.g., in a spanning tree topology in which each relay node has a single donor node). In this example, a second partition 360 may provide access-specific resources for the donor node 305 and may be used for communications between the relay node 310 and the UEFs 315-330. In some cases, portions of the first partition 355 and second partition 360 may be used for backhaul communication (e.g., backhaul communications may be frequency division multiplexed with downlink SSBs). Furthermore, in some cases the second partition 360 may overlap with one or more other partitions. A third partition 365 of resources may be prohibited resources that are to be unused by the donor node 305 or relay node 310, such as for controlling cross-link interference. In some cases, the third partition 365 may be empty. A fourth partition 370 of resource may be reserved for access, and in some cases portions of the fourth partition 370 may be used for backhaul communication.

In some cases, certain transmissions may be provided to particular nodes based on configurations of the receiving node. For example, a paging message may be transmitted based on a UE's (or UEF's) paging configuration. While various examples provided herein are provided for transmission of paging messages, techniques described herein may be implemented for other types of communications as well, such as other control signaling that may be transmitted to a wireless node such as a UE or UEF. In some cases, multiple paging modes may be configured in a communications network. For example, in some 5G or NR systems, two paging modes may be defined, including a core network (CN) paging mode and a radio access network (RAN) paging mode. In CN paging while a UE is in idle mode and needs to be paged (e.g., there is an incoming downlink traffic), the CN may initiate the paging procedure (e.g., an access and mobility function (AMF) at the CN may transmit a paging request to each base station in a tracking area (TA) of the UE). In RAN paging, while the UE is in RRC-connected and inactive mode, the paging may be initiated by a base station in an anchor RAN (e.g. the RAN who has been last to serve the UE).

When using resource partitioning such as illustrated in FIG. 3B, the relay node 310 may receive a paging request and prepare a paging message to be transmitted to a wireless node such as a UE (or UEF 315-330). In some cases, the UE may use discontinuous reception (DRX) in an RRC_IDLE and RRC_INACTIVE state in order to reduce power consumption. When using DRX, the UE may monitor one paging occasion (PO) per DRX cycle and one PO may include multiple time slots (e.g. subframe or OFDM symbol). In some cases, a paging configuration may provide that one paging frame (PF) is one radio frame, which may contain one or multiple POs. The PF may be determined, in some examples, based on a UE identification (UE-ID), a DRX cycle duration, a number of PFs per DRX cycle, or combinations thereof. In some cases, a PO is determined via a table and index, where the index is determined based on the UE-ID, number of PFs per DRX cycle, and number of POs per PF. In some cases, the DRX cycle may be defined as: min(Tc, TuE), where Tc is a cell-specific DRX cycle (e.g., from SIB2/RMSI), and TUE is a UE-specific DRX cycle.

In cases where resource partition 350 may be used in a system, in some cases a wireless node may not have control of resources, as identified by the paging configuration, that are to be used for transmission of a paging message. For example, a paging configuration of a UE may result in a set of paging resources for a paging message to be transmitted by the relay node 310 in the second partition 360 resources, which are controlled by the donor node 305. In cases where the set of paging resources are within the first partition 355, the relay node 310 has control of the resources and may simply transmit a paging message. Further, in cases where the set of paging resources are within the fourth partition 370, the relay node 310 may simply transmit the paging message, although providing system wide allocated resources in the fourth partition 370 that can be used for paging (e.g. paging can be frequency division multiplexed with SSB transmissions) can be wasteful and result in inefficient utilization of resources. Accordingly, techniques provided herein may allow for a wireless node (e.g., relay node 310) to transmit paging messages (or other transmissions) using resources that are not controlled by the wireless node.

In some examples, relay node 310 may transmit a request or announcement to the donor node 305, and any other nodes that may be present, that the set of paging resources is requested for a paging transmission. In some cases, the donor node 305 or other node(s) may provide an indication that the set of paging resources can be used by the relay node 310. In other cases, the relay node 310 may simply transmit the paging message following the request or announcement, and the donor node 305 or other node(s) may refrain from transmissions using the set of paging resources. In further cases, the relay node 310 may autonomously transmit the paging message via the set of paging resources. In further cases, the relay node 310 may select whether to transmit a request or announcement, or whether to autonomously transmit the paging message, based on signaling from another wireless node or network entity (e.g., an AMF of the CN or an anchor gNB that initiated a RAN-based page).

In some cases, the relay node 310 may autonomously transmit the paging message using resources of the set of paging resources based on an AMF transmitting the paging request to all of the wireless nodes within a TA (or outside of the TA but within a vicinity) of the UE being paged. In other cases, the relay node 310 may autonomously transmit the paging message using resources of the set of paging resources based on an anchor wireless node (e.g., an anchor gNB) that initiates RAN-paging for the UE and sends the paging request to the other wireless nodes (e.g., inside or outside TA) in a vicinity of the UE to free up resources. In either of these situations, the AMF or anchor wireless node may identify a list of wireless nodes that are in the vicinity of the UE to be pages, and may send the paging request or other signaling to each of the identified wireless nodes. The identified wireless nodes that receive the paging request or other signaling may refrain from transmissions using the set of paging resources, allowing the relay node 310 to autonomously transmit the paging message using resources from the set of paging resources.

In some cases, the message to the other identified wireless nodes may be similar to a paging request, or may be a simplified paging request that excludes some unnecessary information fields and includes a flag that the signaling is for freeing up resources and not for sending paging, from which a receiving wireless node may infer the set of paging resources. For example, the signaling may include the UE-ID, and the paging configuration of the paging wireless node (e.g., DRX cycle information, number of PFs, number of POs, or combinations thereof). In some cases, the information used to infer the set of paging resources may be provided with the signaling at the time of the transmission of the paging request, or may be transmitted separately indicated to the other identified wireless nodes (e.g., via RRC signaling to the wireless nodes in a vicinity of a UE). In some cases, the signaling to the other identified wireless nodes may simply indicate the set of paging resources need to be freed up (e.g., no indication of paging). In some cases, the signaling to the other identified wireless nodes may also include a priority indication (e.g., the same paging priority indication in established NR or 5G paging request messages may be used for this purpose) that can be used by the wireless nodes to determine whether to free up resources or not. In some cases, the AMF of anchor base station may send the signaling to another entity (e.g., a centralized resource management entity), and not directly to the other wireless nodes.

In some case, the wireless node that is to transmit the paging request, such as the relay node 310 in the example of FIG. 3A, may receive an indication indicating whether it is to autonomously transmit the paging message or whether it is to transmit a request or announcement to ask for the set of paging resources to be freed up by other wireless nodes. In some cases, the indication may be provided in the paging request itself, such as through a flag in the paging request that enables or disables autonomous transmission of the paging message. For example, if the AMF or anchor base station has freed up resources, this can be indicated to the relay node 310. For example, if multiple wireless nodes in a TA are children of the same parent node (e.g., ANF), separate requests for resources may result in many ad-hoc request signals, and in such cases, only a subset (or one) of wireless nodes in the TA may be asked to request for the resources, while others may assume resources are available.

Figure 4:
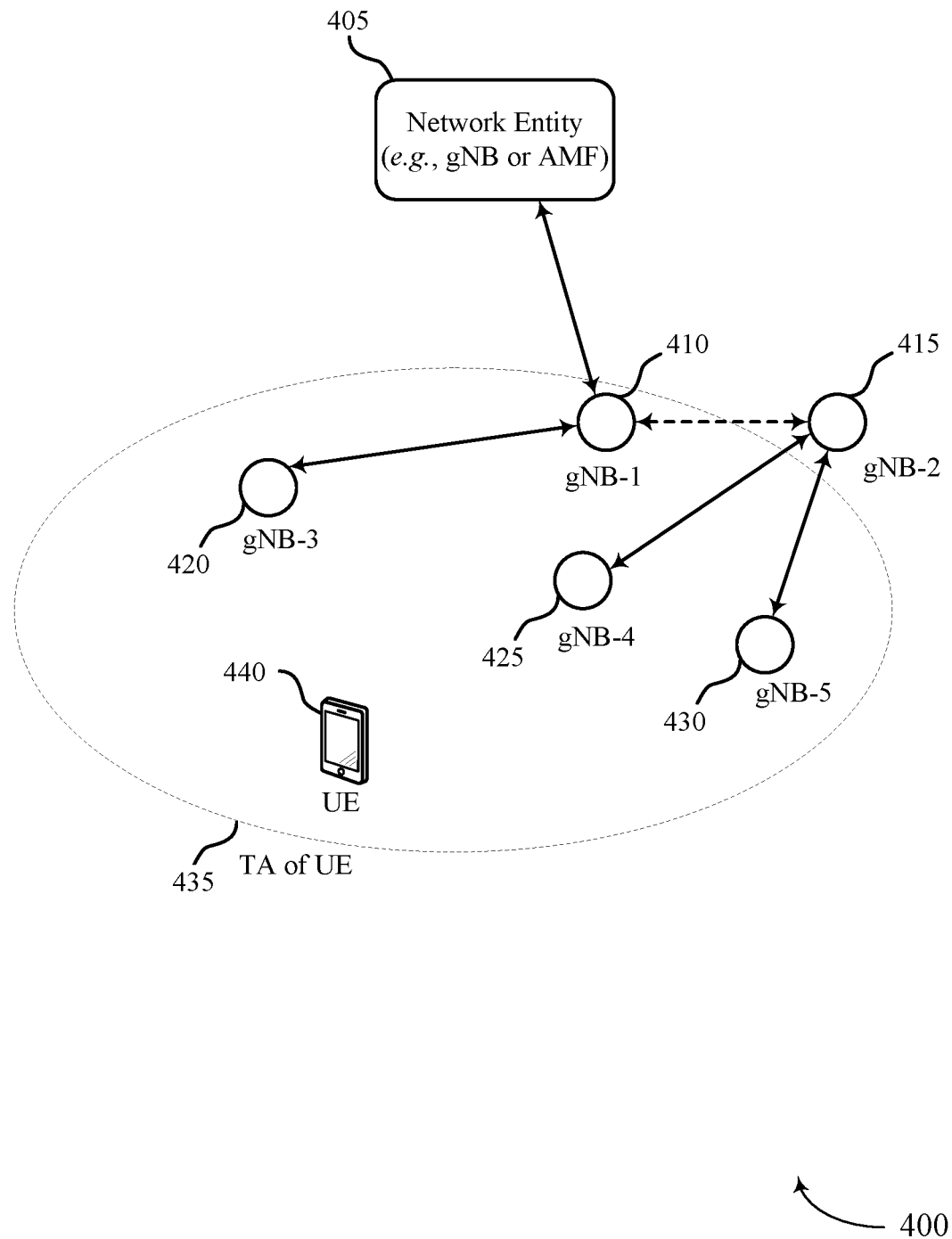
FIG. 4 illustrates another example of a wireless backhaul network that supports paging techniques in accordance with aspects of the present disclosure.

In some cases, a message requesting resources may need to be transmitted or relayed over multiple hops to reach the relevant wireless nodes (e.g., wireless nodes who own the resources that cover the set of paging resources). In such cases, a wireless node that receives a paging request or a request to free up resources may determine to forward an indication of the required resources to other wireless nodes. FIG. 4 provides an illustration of such a situation.

FIG. 4 illustrates an example of a wireless backhaul network 400 that supports paging techniques in accordance with various aspects of the present disclosure. In some examples, wireless backhaul network 400 may implement aspects of wireless communication system 100 or 200. In this example, wireless backhaul network 400 may include a network entity 405 (e.g., an AMF or scheduler in a CN) and a number of wireless nodes that may include a number of gNBs 410 through 430, and a UE 440 having an associated TA 435. In this example, network entity 405 may be connected with a first gNB 410 (e.g., a base station or eNB, which may be a first wireless node) that controls resources of a third gNB 420. A second gNB 415 (which may be a second wireless node) may be outside of the TA 435 of the UE 440 (which may be a third wireless node), and may provide an ANF for a fourth gNB 425 and a fifth gNB 430.

In this example, the second gNB is not part of the TA 435, and in such a case the first gNB 410 or the network entity 405 may request the second gNB to forward a paging request (or other signaling to free up resources of the set of paging resources) indication to the fourth gNB 425 and fifth gNB 430. In some cases, the first gNB 410 may be requested, or may autonomously determine, to forward the paging request to the second gNB 415. In cases where the first gNB autonomously determines to forward the paging request (or other signaling), the first gNB may have information about the network topology in the vicinity and the TA 435.

In some cases, the first gNB 410 (along with one or more other wireless nodes) may receive information about the TA 435 and associated UE(s). Such information may indicate, for example, a list of wireless nodes in the TA 435. In some cases, such information may also include paging configurations of UEs in the TA 435. In some examples, this information may be provided along with a paging request, or separately via other messages (e.g., through some upper-layer signaling). The first gNB 410 may use this information to determine what actions to take regarding the required resources for paging a UE, such as whether to autonomously transmit a paging message via an identified set of paging resources, or whether to request that one or more other wireless nodes free up the set of paging resources. For example, if the first gNB 410 realizes the owner of the set of paging resources is part of the same TA, it may assume that the owner has also received the paging request and autonomously transmit the paging message via the set of paging resources. In some cases, the first gNB 410 may autonomously transmit the paging message when the paging request is a CN based paging request, and may transmit a request to other wireless nodes when the paging request is a RAN based paging request.

Figure 5:
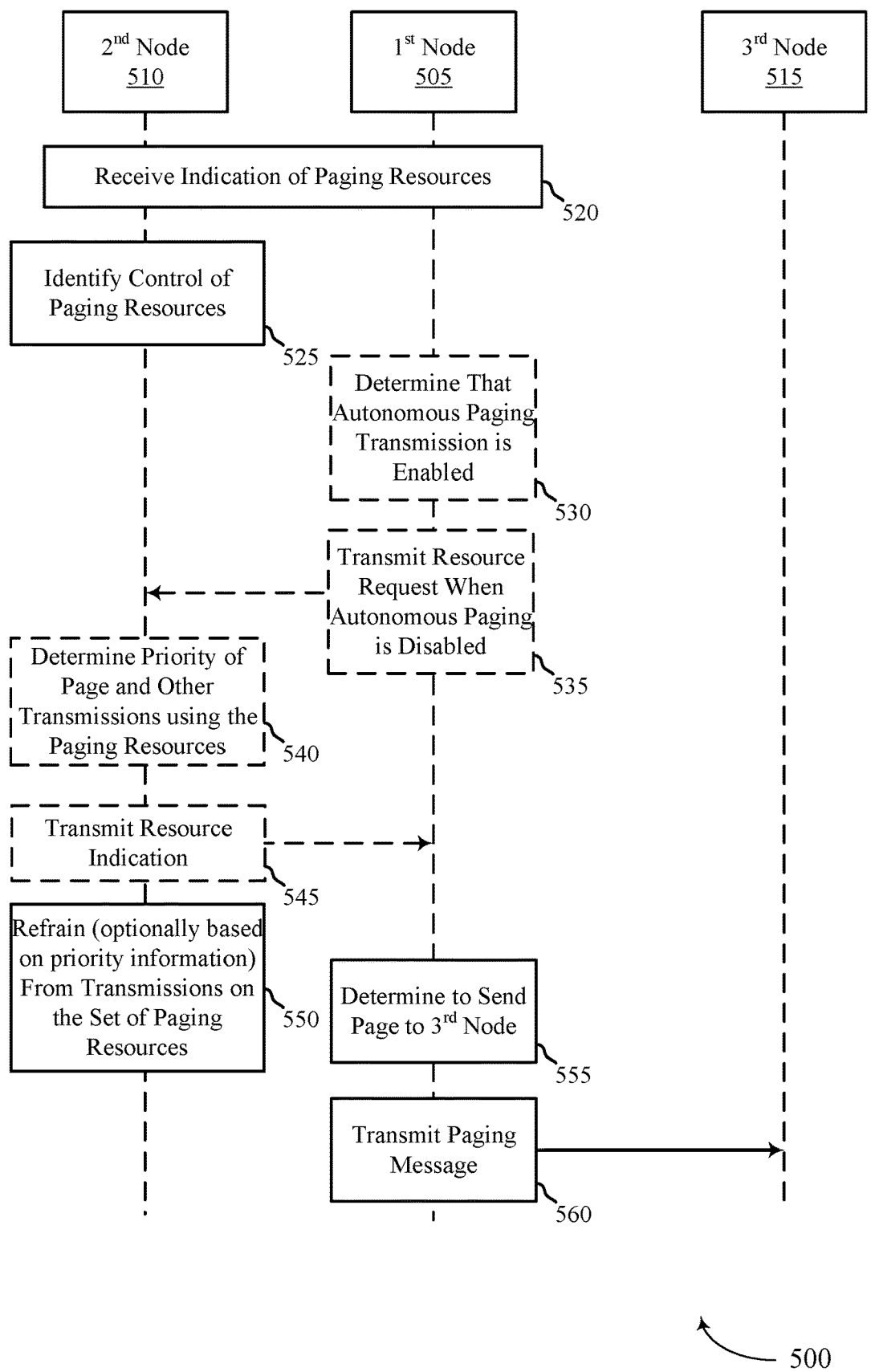
FIG. 5 illustrates an example of a process flow that supports paging techniques in a wireless backhaul network in accordance with aspects of the present disclosure.

FIG. 5 illustrates an example of a process flow 500 that supports paging techniques in a wireless backhaul network in accordance with various aspects of the present disclosure. In some examples, process flow 500 may implement aspects of wireless communication system 100 or 200. Process flow 500 may include a first node 505, a second node 510, and a third node 515, which may be examples of the corresponding devices described herein, e.g., a UE and/or a base station. That is, in some examples each of the first node 505, the second node 510, and the third node 515 may be examples of a base station, which may be executing an ANF or UEF. In some examples, the first node 505 and the second node 510 may be an example of a base station and the third node 515 may be a UE, user device, or the like. The third node may be in communication with or otherwise connected to the first node 505 or the second node 510, or may have no connection or communication established with one or either of the first node 505 or the second node 510.

At 520, the first node 505 and the second node 510 may receive an indication of paging resources for a paging transmission. In some cases, the indication may be received in a paging request that is provided by a network entity such as an AMF or a scheduling entity in a CN. In some cases, the indication of paging resources may be provided in signaling from which paging resources for a number of UEs may be inferred. In some cases, the indication of paging resources may be provided in a RAN mode paging request from another base station.

At 525, the second node 510 may identify that it controls the paging resources. Such identification may be based on, for example, configured partitions of wireless resources in a wireless backhaul network, and a determination that the paging resources are within the configured partition of resources that are controlled by the second node 510. In some cases, the second node 510 may infer the paging resources from DRX cycle information of a UE or UEF that is to be paged, a UE-ID, a number of configured paging opportunities, and a number of configured paging frames.

At 530, the first node 505 may optionally determine that autonomous paging is enabled. Such a determination may be made based on a flag that is set in a paging request, in some examples. In some cases, the determination that autonomous paging is enabled may be based on a type of paging request that is received. For example, autonomous paging may be enabled for CN-based paging requests, and may be disabled for RAN-based paging requests. In some cases, the determination that autonomous paging is enabled may be based on an entity that transmits the paging request (or other signaling) and a knowledge of network topology that indicates that the paging request has also been transmitted to the second node 510. In some cases, the determination that autonomous paging is enabled may be based on a priority level of the paging request.

At 535, the first node 505 may optionally transmit a resource request to the second node 510 when autonomous paging is disabled. In some cases, the resource request may indicate the set of paging resources and request that the second node 510 refrain from transmissions using the set of paging resources. In some cases, following the resource request, the first node 505 may assume that the second node 510 refrains from transmissions using the set of paging resources. In some cases, such an assumption may be based on a priority of the paging request.

At 540, the second node 510 may optionally determine a priority of the page relative to a priority of one or more other transmissions that would otherwise be transmitted using the set of paging resources. In some cases, based on the priority levels, the second node 510 may refrain from transmissions via the set of paging resources, or may proceed with the other transmissions via the set of paging resources. In some cases, the second node 510 may transmit a resource indication 545 to the first node 505 that indicates whether the set of paging resources have been freed up by the second node 510 or not.

At 550, the second node 510 refrains from transmissions via the set of paging resources. As indicated above, in some cases this may be based on priority information associated with the paging request. In some cases, the second node 510 may refrain from transmissions via the set of paging resources based on one or more criteria for autonomous transmission of paging requests as discussed above.

At 555, the first node 505 may determine to send the page to the third node 515. Such a determination may be made autonomously, in cases such as discussed above in which autonomous transmission is enabled. In some cases, a determination may be made following a request or announcement that the paging message is to be transmitted using the set of paging resources. The paging message may be transmitted at 560, using resources of the set of paging resources.

Figure 6:
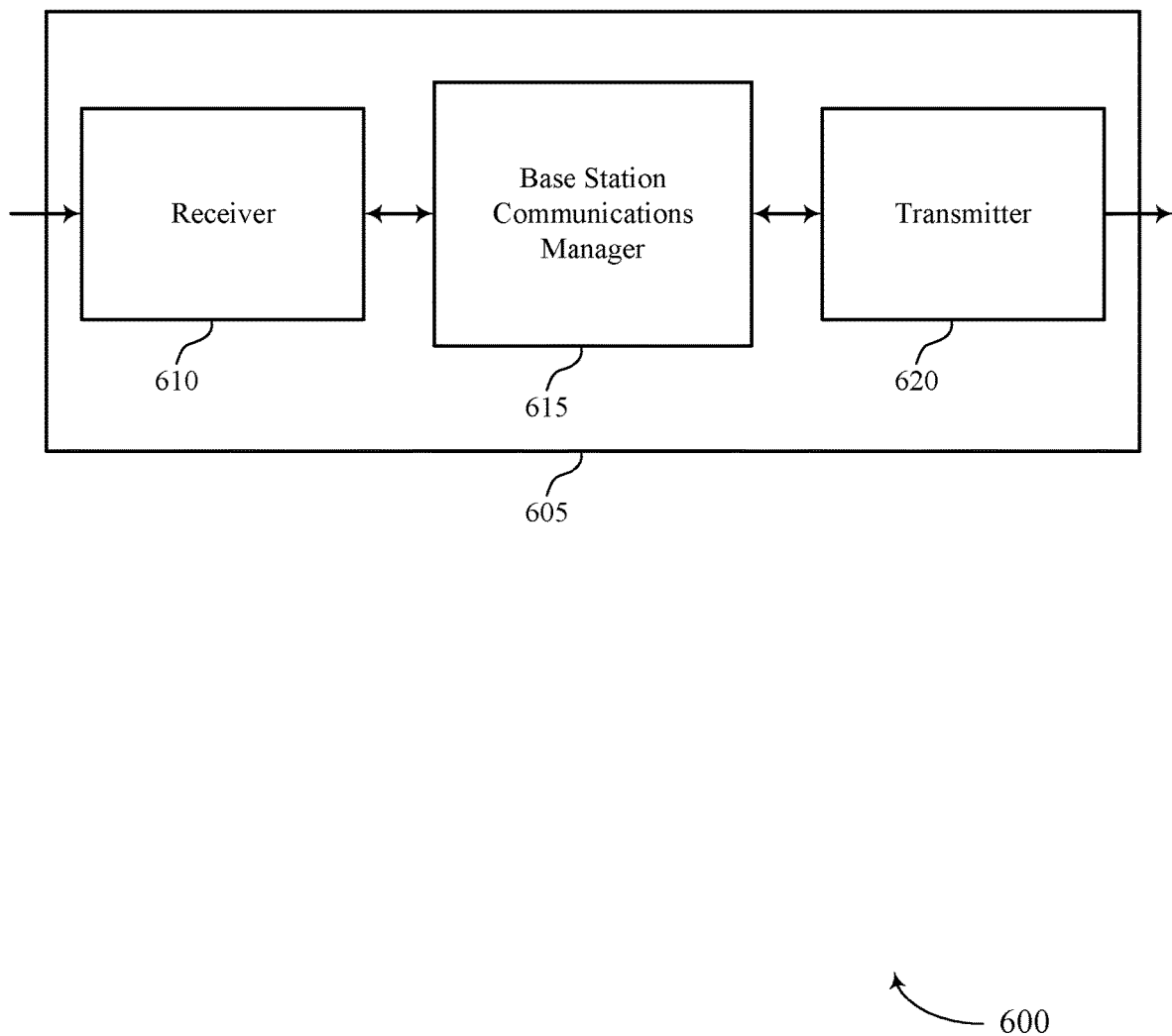
FIGS. 6 through 8 show block diagrams of a device that supports paging techniques in a wireless backhaul network in accordance with aspects of the present disclosure.

FIG. 6 shows a block diagram 600 of a wireless device 605 that supports paging techniques in a wireless backhaul network in accordance with aspects of the present disclosure. Wireless device 605 may be an example of aspects of a base station 105 as described herein. Wireless device 605 may include receiver 610, base station communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to paging techniques in a wireless backhaul network, etc.). Information may be passed on to other components of the device. The receiver 610 may be an example of aspects of the transceiver 935 described with reference to FIG. 9. The receiver 610 may utilize a single antenna or a set of antennas.

Base station communications manager 615 may be an example of aspects of the base station communications manager 915 described with reference to FIG. 9.

Base station communications manager 615 and/or at least some of its various sub-components may be implemented in hardware, software executed by a processor, firmware, or any combination thereof. If implemented in software executed by a processor, the functions of the base station communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 615 and/or at least some of its various sub-components may be physically located at various positions, including being distributed such that portions of functions are implemented at different physical locations by one or more physical devices. In some examples, base station communications manager 615 and/or at least some of its various sub-components may be a separate and distinct component in accordance with various aspects of the present disclosure. In other examples, base station communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 615 may receive, as a first wireless node in a wireless backhaul communications network, an indication of a set of wireless resources that are available for autonomous transmission of one or more paging messages to one or more other wireless nodes, the set of wireless resources controlled by a second wireless node, determine that a paging message is to be transmitted to a third wireless node, and autonomously transmit, based on the indication, the paging message to the third wireless node via the set of wireless resources controlled by the second wireless node.

The base station communications manager 615 may also receive, as a second wireless node in a wireless backhaul communications network, an indication of a set of wireless resources for autonomous transmission of a paging message from a first wireless node to one or more other wireless nodes, the set of wireless resources controlled by the second wireless node, determine that the set of wireless resources are to be unused for transmissions by the second wireless node, and refrain for transmitting via the set of wireless resources based on the determining.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
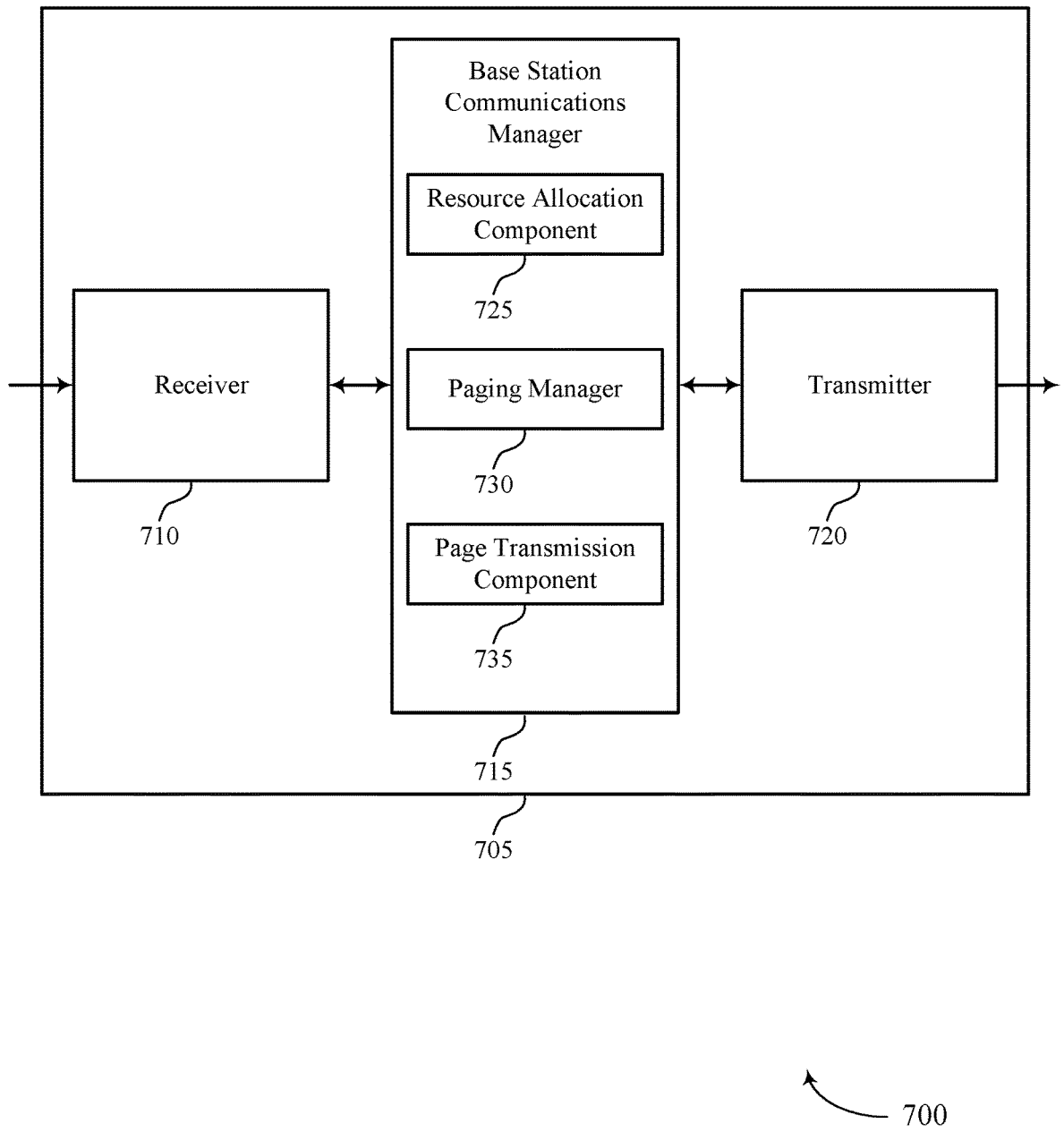

FIG. 7 shows a block diagram 700 of a wireless device 705 that supports paging techniques in a wireless backhaul network in accordance with aspects of the present disclosure. Wireless device 705 may be an example of aspects of a wireless device 605 or a base station 105 as described with reference to FIG. 6. Wireless device 705 may include receiver 710, base station communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to paging techniques in a wireless backhaul network, etc.). Information may be passed on to other components of the device. The receiver 710 may be an example of aspects of the transceiver 935 described with reference to FIG. 9. The receiver 710 may utilize a single antenna or a set of antennas.

Base station communications manager 715 may be an example of aspects of the base station communications manager 915 described with reference to FIG. 9.

Base station communications manager 715 may also include resource allocation component 725, paging manager 730, and page transmission component 735.

Resource allocation component 725 may receive, as a first wireless node in a wireless backhaul communications network, an indication of a set of wireless resources that are available for autonomous transmission of one or more paging messages to one or more other wireless nodes, the set of wireless resources controlled by a second wireless node. In some cases, resource allocation component 725 may determine that the set of wireless resources are available for autonomous transmission of the one or more paging messages when a paging request is received from a network entity of a core network (CN) according to a CN paging mode. In some cases, the determining that autonomous transmission of the at least one other paging message is unavailable is based on at least one other paging request received from another wireless node of the wireless backhaul communications network according to a radio access network (RAN) paging mode. In some cases, resource allocation component 725, as a second wireless node, may determine that the set of wireless resources are to be unused for transmissions by the second wireless node, and refrain for transmitting via the set of wireless resources based on the determining.

Paging manager 730 may determine that a paging message is to be transmitted to a third wireless node. In some cases, paging manager 730 may forward the indication of the set of wireless resources that are available for autonomous transmission of the one or more paging messages to at least a fourth wireless node of the wireless backhaul communications network. In some cases, paging manager 730 may receive information identifying at least the third wireless node and a tracking area (TA) associated with the third wireless node, where the first wireless node is part of the TA. In some cases, paging manager 730 may receive, as a second wireless node in a wireless backhaul communications network, an indication of a set of wireless resources for autonomous transmission of a paging message from a first wireless node to one or more other wireless nodes. In some cases, the indication is for a page to a user equipment in a tracking area (TA) of the first wireless node, and is forwarded to the fourth wireless node in the TA via one or more intermediary wireless nodes of the wireless backhaul communications network.

In some cases, the information further identifies that at least the second wireless node is part of the TA, and where the first wireless node autonomously transmitting the paging message is based on the first wireless node and the second wireless node being part of the TA. In some cases, the information further identifies that at least a fourth wireless node is not part of the TA, and a request for resources may be transmitted to the fourth wireless node for transmission of the one or more paging messages. In some cases, the indication is received from an access and mobility function (AMF) or another wireless node of the wireless backhaul communications network.

Page transmission component 735 may autonomously transmit, based on the indication, the paging message to the third wireless node via the set of wireless resources controlled by the second wireless node.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
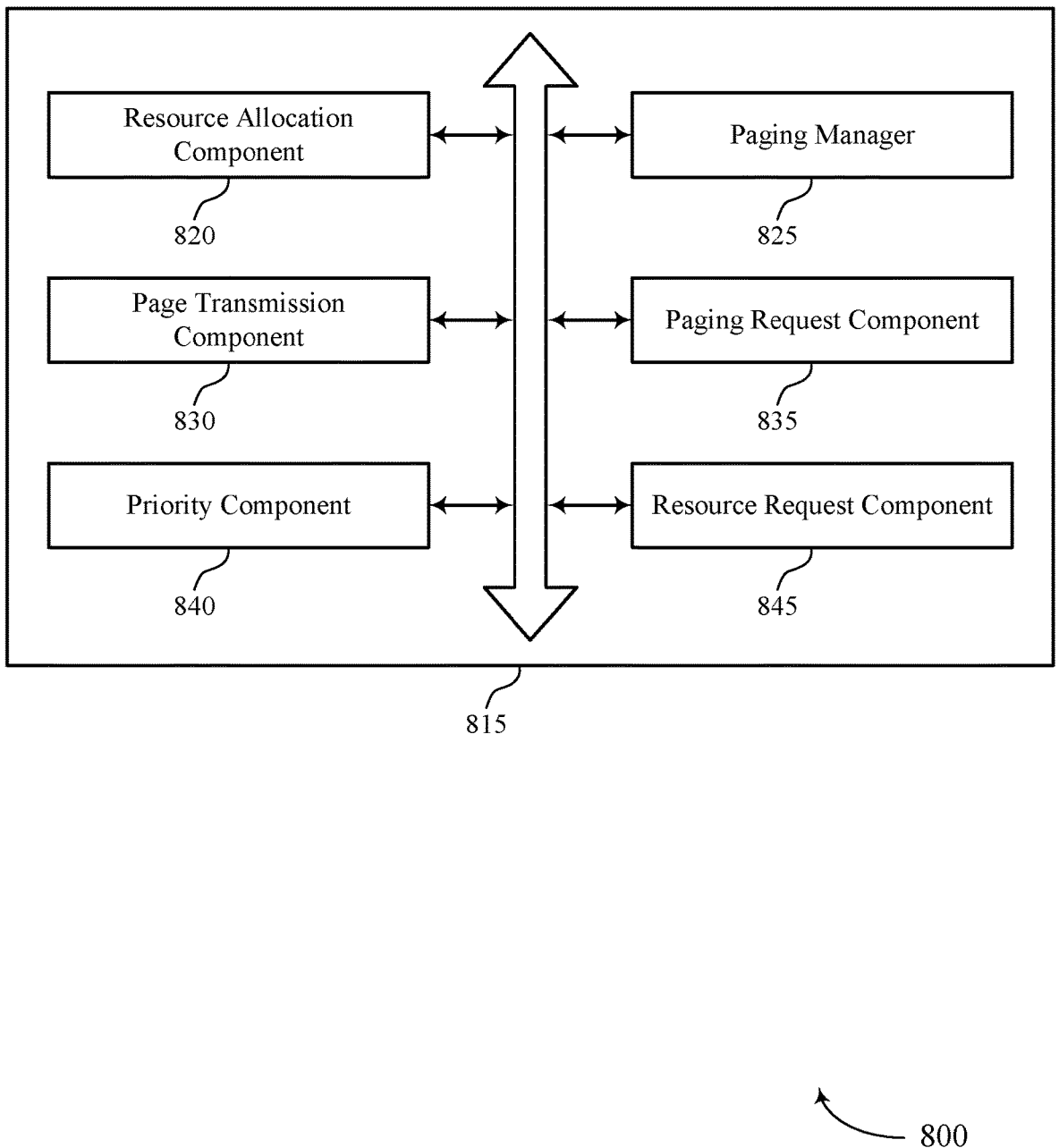

FIG. 8 shows a block diagram 800 of a base station communications manager 815 that supports paging techniques in a wireless backhaul network in accordance with aspects of the present disclosure. The base station communications manager 815 may be an example of aspects of a base station communications manager 615, a base station communications manager 715, or a base station communications manager 915 described with reference to FIGS. 6, 7, and 9. The base station communications manager 815 may include resource allocation component 820, paging manager 825, page transmission component 830, paging request component 835, priority component 840, and resource request component 845. Each of these modules may communicate, directly or indirectly, with one another (e.g., via one or more buses).

Resource allocation component 820 may receive, as a first wireless node in a wireless backhaul communications network, an indication of a set of wireless resources that are available for autonomous transmission of one or more paging messages to one or more other wireless nodes, the set of wireless resources controlled by a second wireless node. In some cases, resource allocation component 820 may determine that the set of wireless resources are available for autonomous transmission of the one or more paging messages when a paging request is received from a network entity of a core network (CN) according to a CN paging mode. In some cases, the determining that autonomous transmission of the at least one other paging message is unavailable is based on at least one other paging request received from another wireless node of the wireless backhaul communications network according to a radio access network (RAN) paging mode. In some cases, resource allocation component 820, as a second wireless node, may determine that the set of wireless resources are to be unused for transmissions by the second wireless node, and refrain for transmitting via the set of wireless resources based on the determining.

Paging manager 825 may determine that a paging message is to be transmitted to a third wireless node. In some cases, paging manager 825 may forward the indication of the set of wireless resources that are available for autonomous transmission of the one or more paging messages to at least a fourth wireless node of the wireless backhaul communications network. In some cases, paging manager 825 may receive information identifying at least the third wireless node and a tracking area (TA) associated with the third wireless node, where the first wireless node is part of the TA. In some cases, paging manager 825 may receive, as a second wireless node in a wireless backhaul communications network, an indication of a set of wireless resources for autonomous transmission of a paging message from a first wireless node to one or more other wireless nodes. In some cases, the indication is for a page to a user equipment in a tracking area (TA) of the first wireless node, and is forwarded to the fourth wireless node in the TA via one or more intermediary wireless nodes of the wireless backhaul communications network.

In some cases, the information further identifies that at least the second wireless node is part of the TA, and where the first wireless node autonomously transmitting the paging message is based on the first wireless node and the second wireless node being part of the TA. In some cases, the information further identifies that at least a fourth wireless node is not part of the TA, and a request for resources may be transmitted to the fourth wireless node for transmission of the one or more paging messages. In some cases, the indication is received from an access and mobility function (AMF) or another wireless node of the wireless backhaul communications network.

Page transmission component 830 may autonomously transmit, based on the indication, the paging message to the third wireless node via the set of wireless resources controlled by the second wireless node.

Paging request component 835 may identify information related to a paging request in received signaling. In some cases, signaling may indicate that the paging message is to be transmitted to the third wireless node, and indicate the set of wireless resources are available for autonomous transmission of the paging message. In some cases, the signaling includes a paging request received from a network entity of the wireless backhaul communications network according to a core network (CN) paging mode, or from a fourth wireless node of the wireless backhaul communications network according to a radio access network (RAN) paging mode. In some cases, the signaling includes a paging request that provides information on one or more of a UE-ID for a UE to be paged, discontinuous reception (DRX) cycle information for the UE, a number of paging frames, a number of paging opportunities, or any combinations thereof, from which the set of wireless resources that are available for autonomous transmission can be inferred. In some cases, the indication that the set of wireless resources are available for autonomous transmission of the one or more paging messages is a second request message transmitted by another wireless node indicating that resources are requested for the paging message. In some cases, the information is received as part of a paging request received at the first wireless node or in one or more configuration messages received at the first wireless node.

Priority component 840 may compare a first priority of the paging message relative to a second priority of one or more other transmissions of the second wireless node associated with the set of wireless resources. In some cases, the signaling includes a priority indicator associated with the paging message, and where the transmitting the paging message is further based on the priority indicator. In some cases, the indication includes a priority indicator associated with the paging message. In some cases, the refraining from transmitting via the set of wireless resources is based on the comparing.

Resource request component 845 may determine that autonomous transmission of at least one other paging message is unavailable, the at least one other paging message to be transmitted to a fourth wireless node via the set of wireless resources controlled by the second wireless node, and transmit a request message to the second wireless node indicating that resources are requested at the first wireless node. In some cases, resource request component 845 may receive an indication of available resources from the second wireless node, and transmit the at least one other paging message to the fourth wireless node via the indicated available resources. In some cases, the determining that autonomous transmission of the at least one other paging message is unavailable is based on a flag provided with a paging request. In some cases, the indication is received in a paging request that indicates that the paging message is to be transmitted to a UE, the paging request including a flag that indicates whether the set of wireless resources are to be available for autonomous transmission of the paging message.

Figure 9:
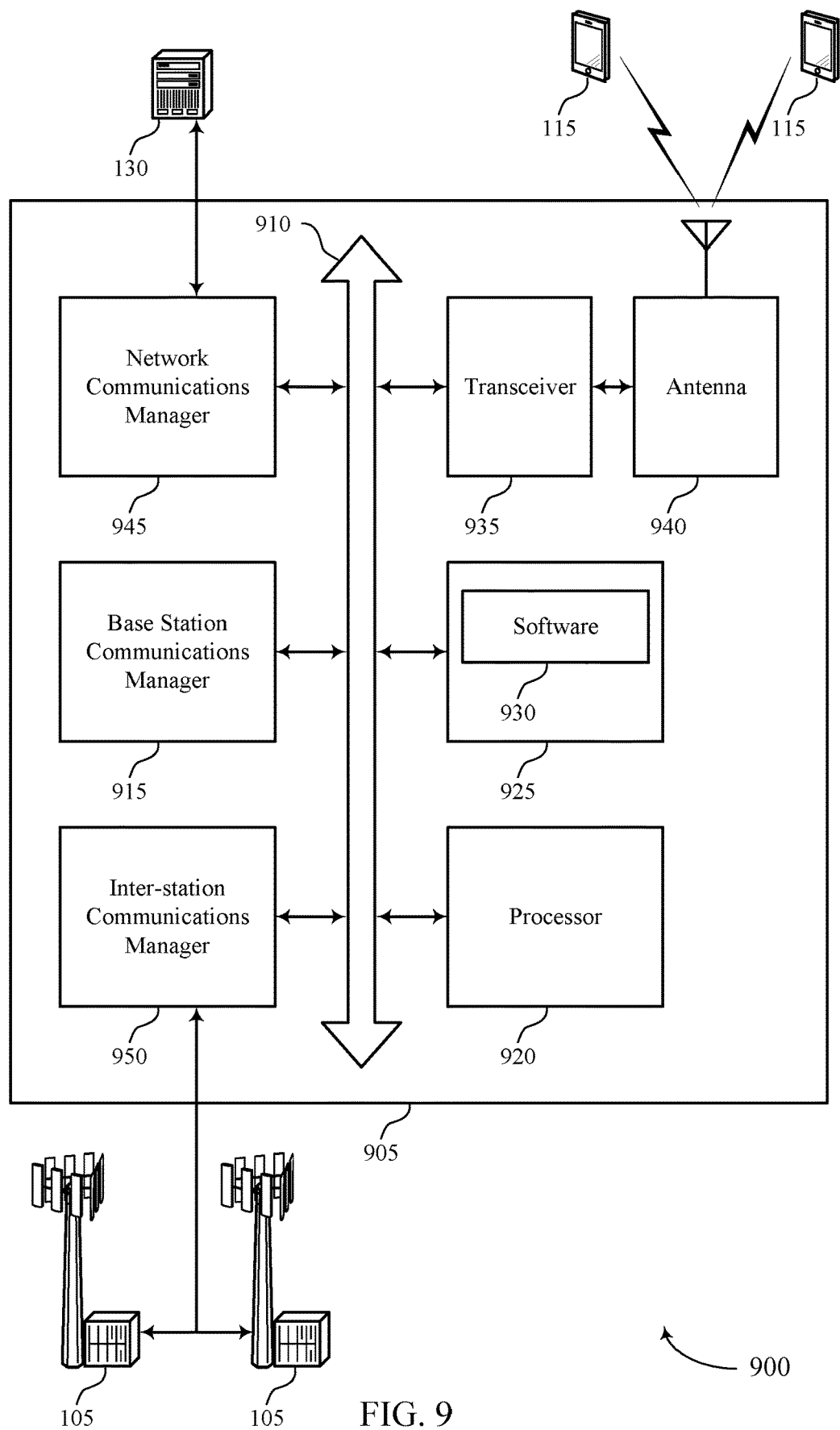
FIG. 9 illustrates a block diagram of a system including a base station that supports paging techniques in a wireless backhaul network in accordance with aspects of the present disclosure.

FIG. 9 shows a diagram of a system 900 including a device 905 that supports paging techniques in a wireless backhaul network in accordance with aspects of the present disclosure. Device 905 may be an example of or include the components of wireless device 605, wireless device 705, or a base station 105 as described above, e.g., with reference to FIGS. 6 and 7. Device 905 may include components for bi-directional voice and data communications including components for transmitting and receiving communications, including base station communications manager 915, processor 920, memory 925, software 930, transceiver 935, antenna 940, network communications manager 945, and inter-station communications manager 950. These components may be coupled and in electronic communication via one or more buses (e.g., bus 910). Device 905 may communicate wirelessly with one or more UEs 115.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting paging techniques in a wireless backhaul network).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support paging techniques in a wireless backhaul network. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

Network communications manager 945 may manage communications with the core network (e.g., via one or more wired backhaul links). For example, the network communications manager 945 may manage the transfer of data communications for client devices, such as one or more UEs 115.

Inter-station communications manager 950 may manage communications with other base station 105, and may include a controller or scheduler for controlling communications with UEs 115 in cooperation with other base stations 105. For example, the inter-station communications manager 950 may coordinate scheduling for transmissions to UEs 115 for various interference mitigation techniques such as beamforming or joint transmission. In some examples, inter-station communications manager 950 may provide an X2 interface within a Long Term Evolution (LTE)/LTE-A wireless communication network technology to provide communication between base stations 105.

Figure 10:
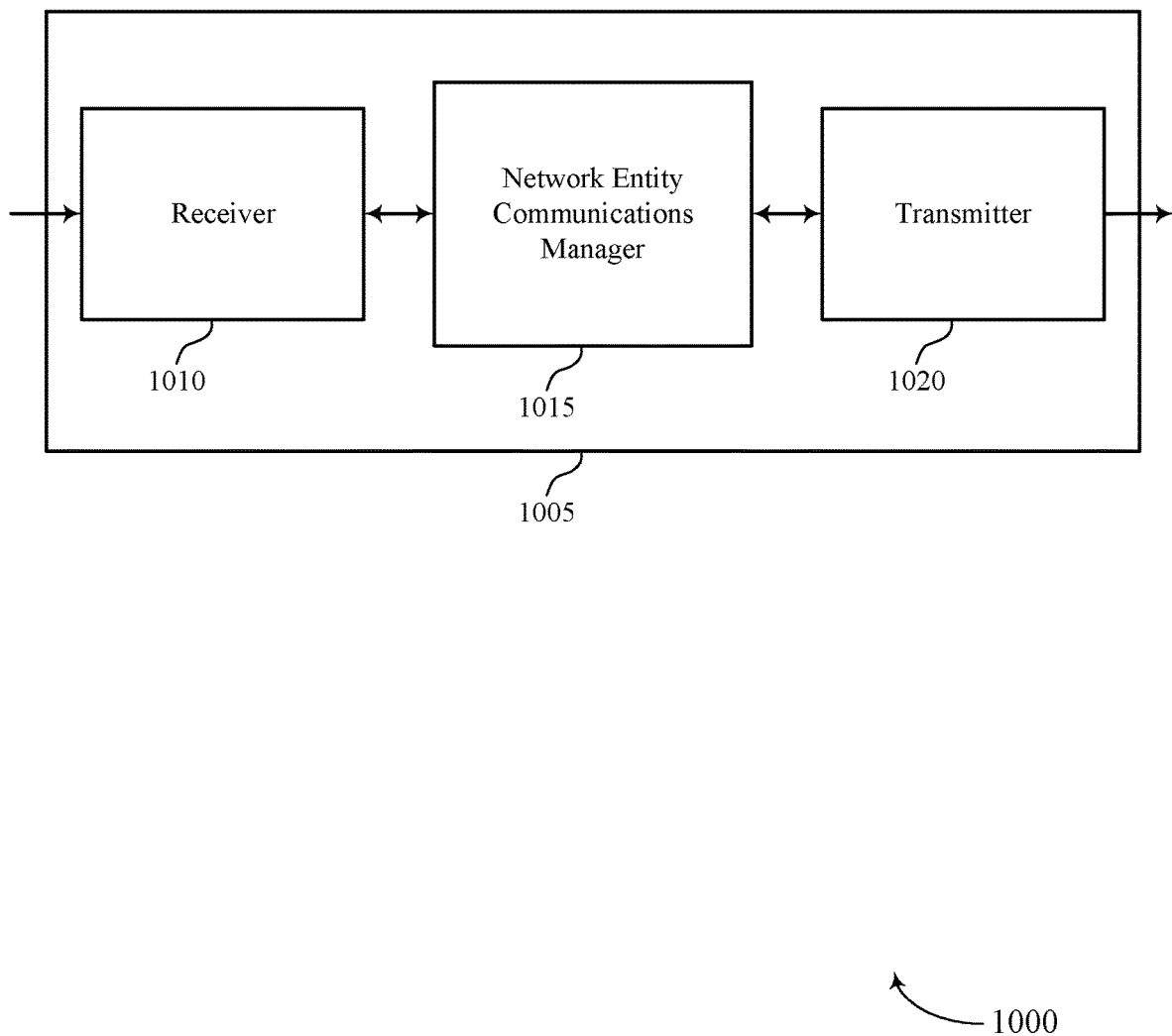
FIGS. 10 through 12 show block diagrams of a device that supports paging techniques in a wireless backhaul network in accordance with aspects of the present disclosure.

FIG. 10 shows a block diagram 1000 of a wireless device 1005 that supports paging techniques in a wireless backhaul network in accordance with aspects of the present disclosure. Wireless device 1005 may be an example of aspects of a network entity as described herein. Wireless device 1005 may include receiver 1010, network entity communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to paging techniques in a wireless backhaul network, etc.). Information may be passed on to other components of the device. The receiver 1010 may be an example of aspects of the transceiver 1335 described with reference to FIG. 13. The receiver 1010 may utilize a single antenna or a set of antennas.

Network entity communications manager 1015 may be an example of aspects of the network entity communications manager 1315 described with reference to FIG. 13.

Network entity communications manager 1015 and/or at least some of its various sub-components may be implemented in hardware, software executed by a processor, firmware, or any combination thereof. If implemented in software executed by a processor, the functions of the network entity communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The network entity communications manager 1015 and/or at least some of its various sub-components may be physically located at various positions, including being distributed such that portions of functions are implemented at different physical locations by one or more physical devices. In some examples, network entity communications manager 1015 and/or at least some of its various sub-components may be a separate and distinct component in accordance with various aspects of the present disclosure. In other examples, network entity communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Network entity communications manager 1015 may determine that a paging message is to be transmitted to a UE having a connection with a first wireless node in a wireless backhaul communications network, identify a set of wireless resources for transmission of the paging message to the UE and a second wireless node in the wireless backhaul communications network that controls resources that include the set of wireless resources for transmission of the paging message to the UE, and transmit, to the first wireless node and the second wireless node, an indication of the set of wireless resources and that the set of wireless resources are available for autonomous transmission of the paging message by the first wireless node.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
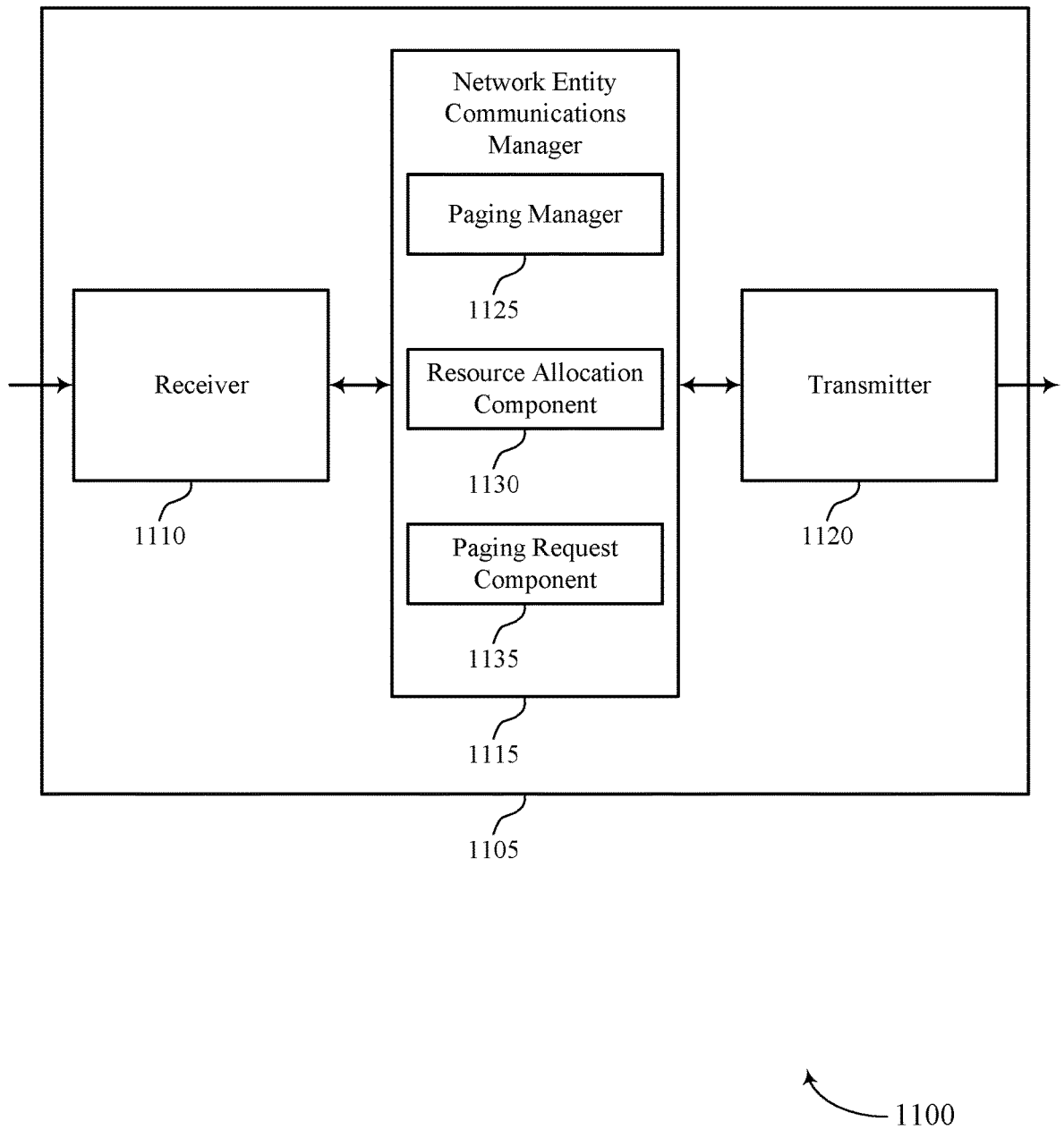

FIG. 11 shows a block diagram 1100 of a wireless device 1105 that supports paging techniques in a wireless backhaul network in accordance with aspects of the present disclosure. Wireless device 1105 may be an example of aspects of a wireless device 1005 or a network entity as described with reference to FIG. 10. Wireless device 1105 may include receiver 1110, network entity communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to paging techniques in a wireless backhaul network, etc.). Information may be passed on to other components of the device. The receiver 1110 may be an example of aspects of the transceiver 1335 described with reference to FIG. 13. The receiver 1110 may utilize a single antenna or a set of antennas.

Network entity communications manager 1115 may be an example of aspects of the network entity communications manager 1315 described with reference to FIG. 13.

Network entity communications manager 1115 may also include paging manager 1125, resource allocation component 1130, and paging request component 1135.

Paging manager 1125 may determine that a paging message is to be transmitted to a UE having a connection with a first wireless node in a wireless backhaul communications network and transmit information identifying a set of wireless nodes within a tracking area (TA) of the UE to each of the first wireless node and the second wireless node. In some cases, the network entity is an access and mobility function (AMF) or another wireless node of the wireless backhaul communications network. In some cases, the indication of the set of wireless resources is transmitted to one or more of the first wireless node or the second wireless node via one or more intermediary wireless nodes of the wireless backhaul communications network.

Resource allocation component 1130 may identify a set of wireless resources for transmission of the paging message to the UE and a second wireless node in the wireless backhaul communications network that controls resources that include the set of wireless resources for transmission of the paging message to the UE. In some cases, the identifying the second wireless node in the wireless backhaul communications network includes identifying a set of wireless nodes that have overlapping coverage areas with the first wireless node, and where the indication of the set of wireless resources is transmitted to each of the identified set of wireless nodes that have overlapping coverage areas with the first wireless node.

Paging request component 1135 may transmit, to the first wireless node and the second wireless node, an indication of the set of wireless resources and that the set of wireless resources are available for autonomous transmission of the paging message by the first wireless node. In some cases, the transmitting the indication includes transmitting a paging request that indicates that the paging message is to be transmitted to the UE, the paging request including a flag that indicates whether the set of wireless resources are available for autonomous transmission of the paging message.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
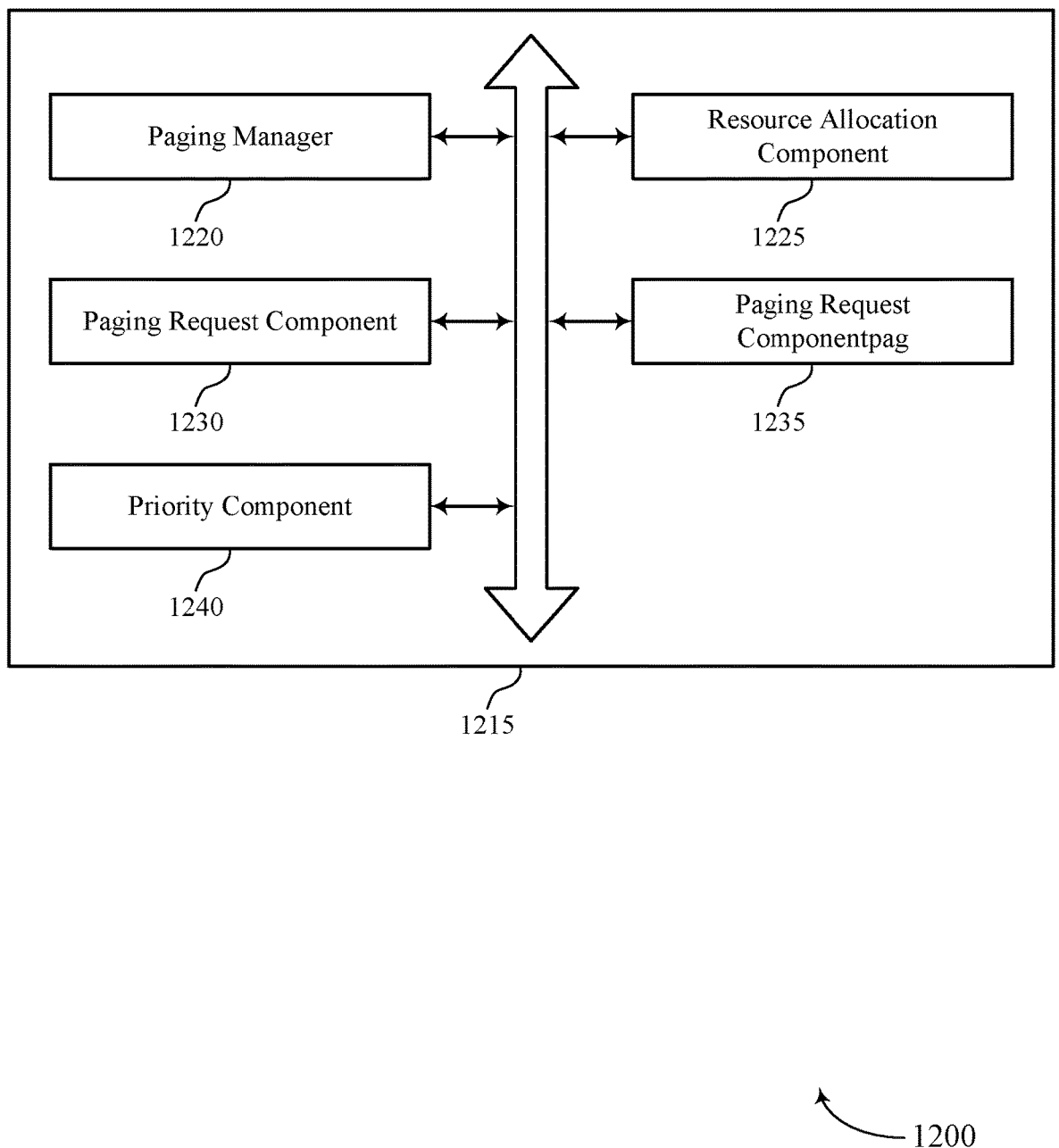

FIG. 12 shows a block diagram 1200 of a network entity communications manager 1215 that supports paging techniques in a wireless backhaul network in accordance with aspects of the present disclosure. The network entity communications manager 1215 may be an example of aspects of a network entity communications manager 1315 described with reference to FIGS. 10, 11, and 13. The network entity communications manager 1215 may include paging manager 1220, resource allocation component 1225, paging request component 1230, paging request component 1235, and priority component 1240. Each of these modules may communicate, directly or indirectly, with one another (e.g., via one or more buses).

Paging manager 1220 may determine that a paging message is to be transmitted to a UE having a connection with a first wireless node in a wireless backhaul communications network and transmit information identifying a set of wireless nodes within a tracking area (TA) of the UE to each of the first wireless node and the second wireless node. In some cases, the network entity is an access and mobility function (AMF) or another wireless node of the wireless backhaul communications network. In some cases, the indication of the set of wireless resources is transmitted to one or more of the first wireless node or the second wireless node via one or more intermediary wireless nodes of the wireless backhaul communications network.

Resource allocation component 1225 may identify a set of wireless resources for transmission of the paging message to the UE and a second wireless node in the wireless backhaul communications network that controls resources that include the set of wireless resources for transmission of the paging message to the UE. In some cases, the identifying the second wireless node in the wireless backhaul communications network includes identifying a set of wireless nodes that have overlapping coverage areas with the first wireless node, and where the indication of the set of wireless resources is transmitted to each of the identified set of wireless nodes that have overlapping coverage areas with the first wireless node.

Paging request component 1230 may transmit, to the first wireless node and the second wireless node, an indication of the set of wireless resources and that the set of wireless resources are available for autonomous transmission of the paging message by the first wireless node. In some cases, the transmitting the indication includes transmitting a paging request that indicates that the paging message is to be transmitted to the UE, the paging request including a flag that indicates whether the set of wireless resources are available for autonomous transmission of the paging message.

Paging request component 1235 may provide the second wireless node with information that the set of wireless resources are to be unused for transmissions by the second wireless node.

Priority component 1240 may provide a priority indicator associated with the paging message, the priority indicator usable by the second wireless node to determine that the set of wireless resources are to be unused for transmissions by the second wireless node.

Figure 13:
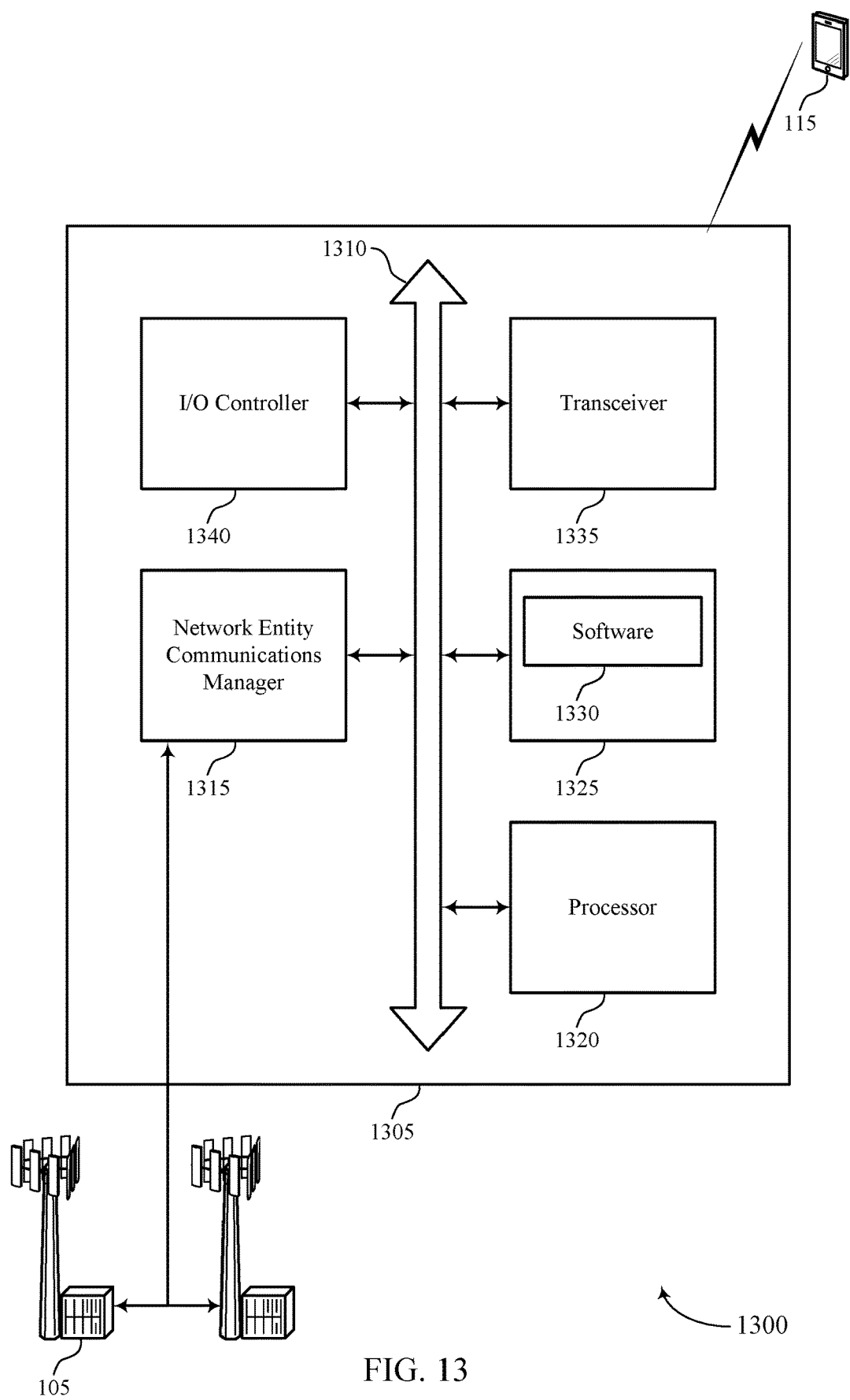
FIG. 13 illustrates a block diagram of a system including a network entity that supports paging techniques in a wireless backhaul network in accordance with aspects of the present disclosure.

FIG. 13 shows a diagram of a system 1300 including a device 1305 that supports paging techniques in a wireless backhaul network in accordance with aspects of the present disclosure. Device 1305 may be an example of or include the components of network entity as described above, e.g., with reference to FIG. 1. Device 1305 may include components for bi-directional voice and data communications including components for transmitting and receiving communications, including network entity communications manager 1315, processor 1320, memory 1325, software 1330, transceiver 1335, and I/O controller 1340. These components may be coupled and in electronic communication via one or more buses (e.g., bus 1310).

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting paging techniques in a wireless backhaul network).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support paging techniques in a wireless backhaul network. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

I/O controller 1340 may manage input and output signals for device 1305. I/O controller 1340 may also manage peripherals not integrated into device 1305. In some cases, I/O controller 1340 may represent a physical connection or port to an external peripheral. In some cases, I/O controller 1340 may utilize an operating system such as iOS®, ANDROID®, MS-DOS®, MS-WINDOWS®, OS/2®, UNIX®, LINUX®, or another known operating system. In other cases, I/O controller 1340 may represent or interact with a modem, a keyboard, a mouse, a touchscreen, or a similar device. In some cases, I/O controller 1340 may be implemented as part of a processor. In some cases, a user may interact with device 1305 via I/O controller 1340 or via hardware components controlled by I/O controller 1340.

Figure 14:
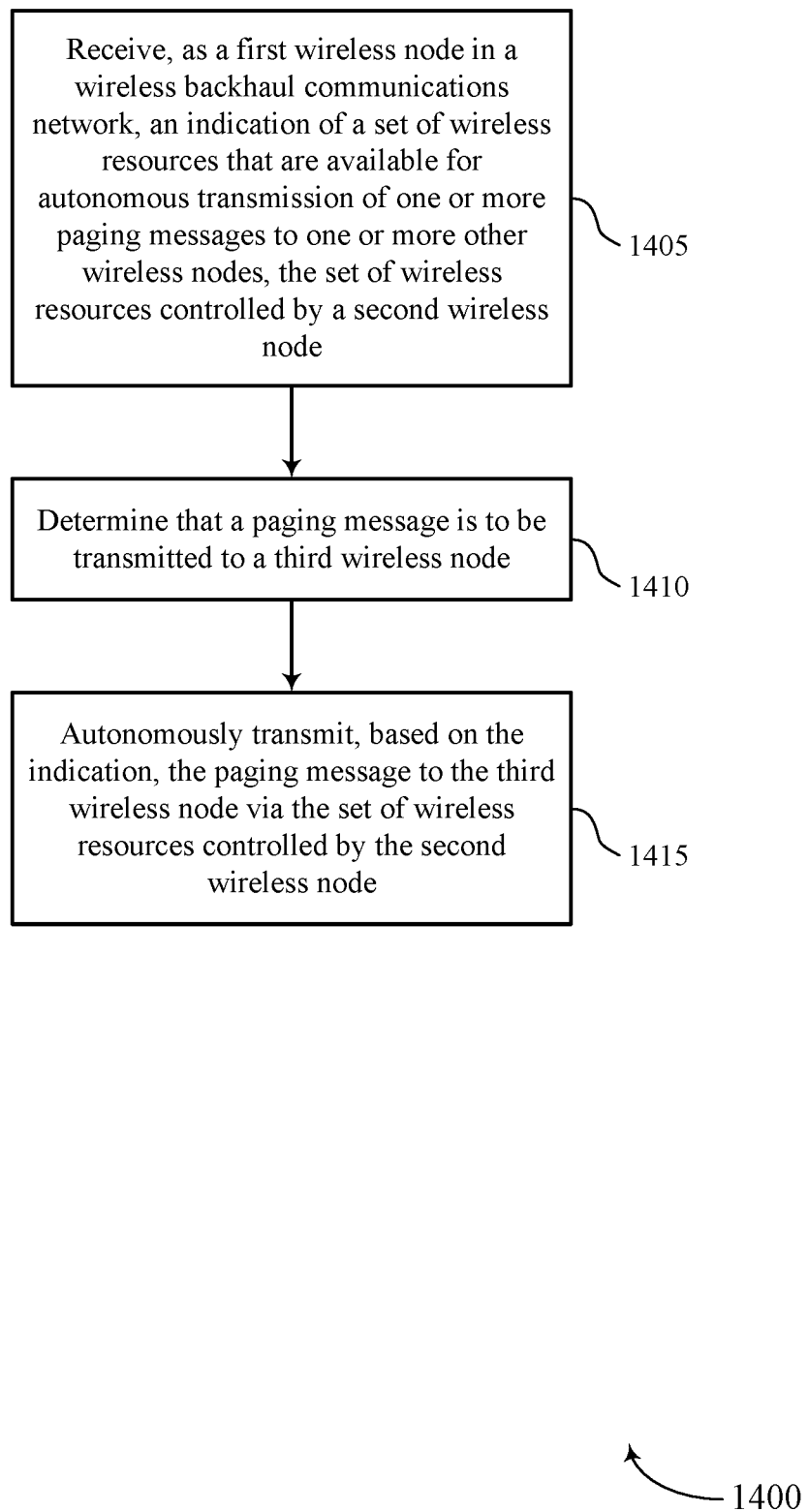
FIGS. 14 through 19 illustrate methods for paging techniques in a wireless backhaul network in accordance with aspects of the present disclosure.

FIG. 14 shows a flowchart illustrating a method 1400 for paging techniques in a wireless backhaul network in accordance with aspects of the present disclosure. The operations of method 1400 may be implemented by a base station 105 or its components as described herein. For example, the operations of method 1400 may be performed by a base station communications manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At 1405 the base station 105 may receive, as a first wireless node in a wireless backhaul communications network, an indication of a set of wireless resources that are available for autonomous transmission of one or more paging messages to one or more other wireless nodes, the set of wireless resources controlled by a second wireless node. The operations of 1405 may be performed according to the methods described herein. In certain examples, aspects of the operations of 1405 may be performed by a resource allocation component as described with reference to FIGS. 6 through 9.

At 1410 the base station 105 may determine that a paging message is to be transmitted to a third wireless node. The operations of 1410 may be performed according to the methods described herein. In certain examples, aspects of the operations of 1410 may be performed by a paging manager as described with reference to FIGS. 6 through 9.

At 1415 the base station 105 may autonomously transmit, based at least in part on the indication, the paging message to the third wireless node via the set of wireless resources controlled by the second wireless node. The operations of 1415 may be performed according to the methods described herein. In certain examples, aspects of the operations of 1415 may be performed by a page transmission component as described with reference to FIGS. 6 through 9.

Figure 15:
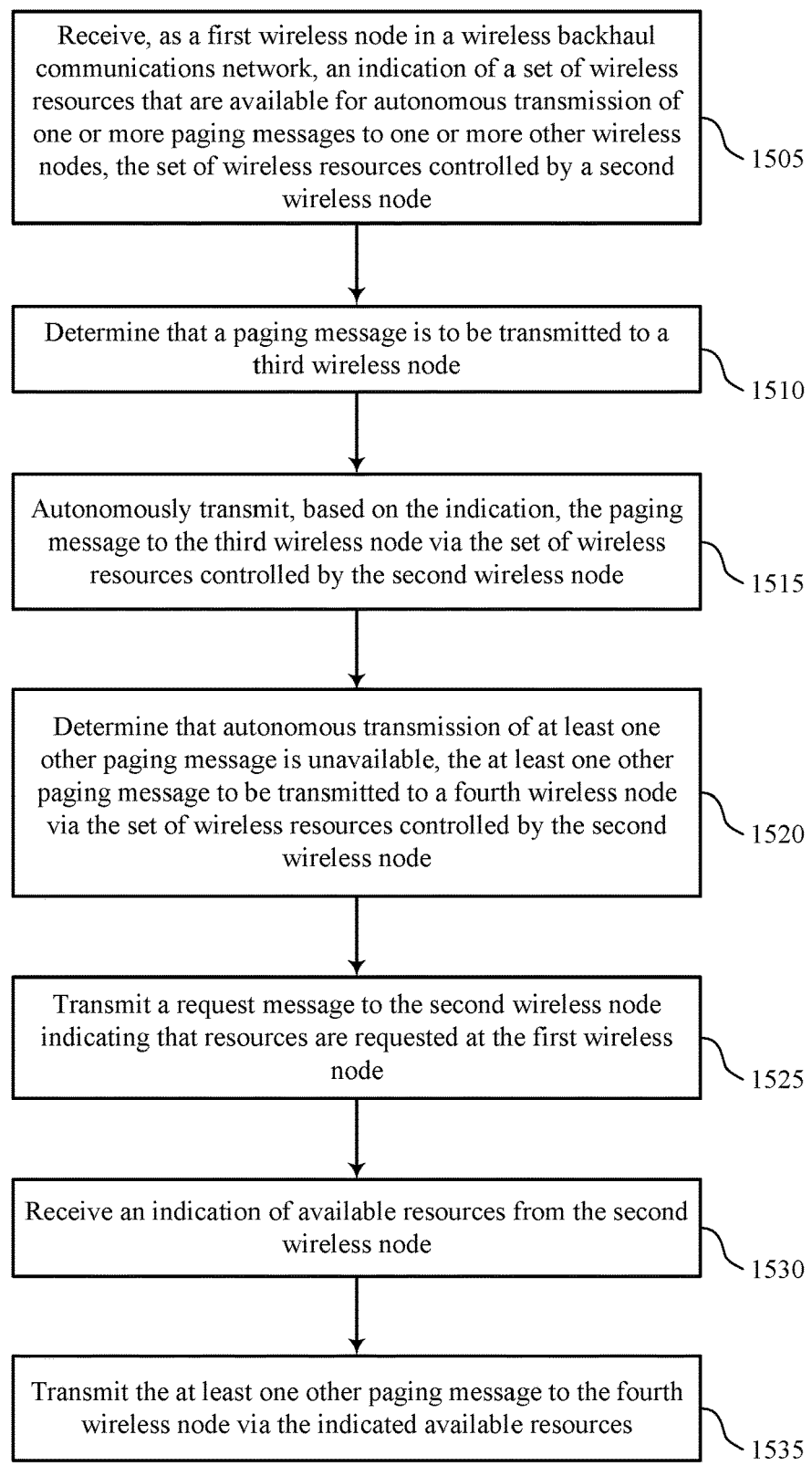

FIG. 15 shows a flowchart illustrating a method 1500 for paging techniques in a wireless backhaul network in accordance with aspects of the present disclosure. The operations of method 1500 may be implemented by a base station 105 or its components as described herein. For example, the operations of method 1500 may be performed by a base station communications manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At 1505 the base station 105 may receive, as a first wireless node in a wireless backhaul communications network, an indication of a set of wireless resources that are available for autonomous transmission of one or more paging messages to one or more other wireless nodes, the set of wireless resources controlled by a second wireless node. The operations of 1505 may be performed according to the methods described herein. In certain examples, aspects of the operations of 1505 may be performed by a resource allocation component as described with reference to FIGS. 6 through 9.

At 1510 the base station 105 may determine that a paging message is to be transmitted to a third wireless node. The operations of 1510 may be performed according to the methods described herein. In certain examples, aspects of the operations of 1510 may be performed by a paging manager as described with reference to FIGS. 6 through 9.

At 1515 the base station 105 may autonomously transmit, based at least in part on the indication, the paging message to the third wireless node via the set of wireless resources controlled by the second wireless node. The operations of 1515 may be performed according to the methods described herein. In certain examples, aspects of the operations of 1515 may be performed by a page transmission component as described with reference to FIGS. 6 through 9.

At 1520 the base station 105 may determine that autonomous transmission of at least one other paging message is unavailable, the at least one other paging message to be transmitted to a fourth wireless node via the set of wireless resources controlled by the second wireless node. The operations of 1520 may be performed according to the methods described herein. In certain examples, aspects of the operations of 1520 may be performed by a resource request component as described with reference to FIGS. 6 through 9.

At 1525 the base station 105 may transmit a request message to the second wireless node indicating that resources are requested at the first wireless node. The operations of 1525 may be performed according to the methods described herein. In certain examples, aspects of the operations of 1525 may be performed by a resource request component as described with reference to FIGS. 6 through 9.

At 1530 the base station 105 may receive an indication of available resources from the second wireless node. The operations of 1530 may be performed according to the methods described herein. In certain examples, aspects of the operations of 1530 may be performed by a resource request component as described with reference to FIGS. 6 through 9.

At 1535 the base station 105 may transmit the at least one other paging message to the fourth wireless node via the indicated available resources. The operations of 1535 may be performed according to the methods described herein. In certain examples, aspects of the operations of 1535 may be performed by a resource request component as described with reference to FIGS. 6 through 9.

Figure 16:
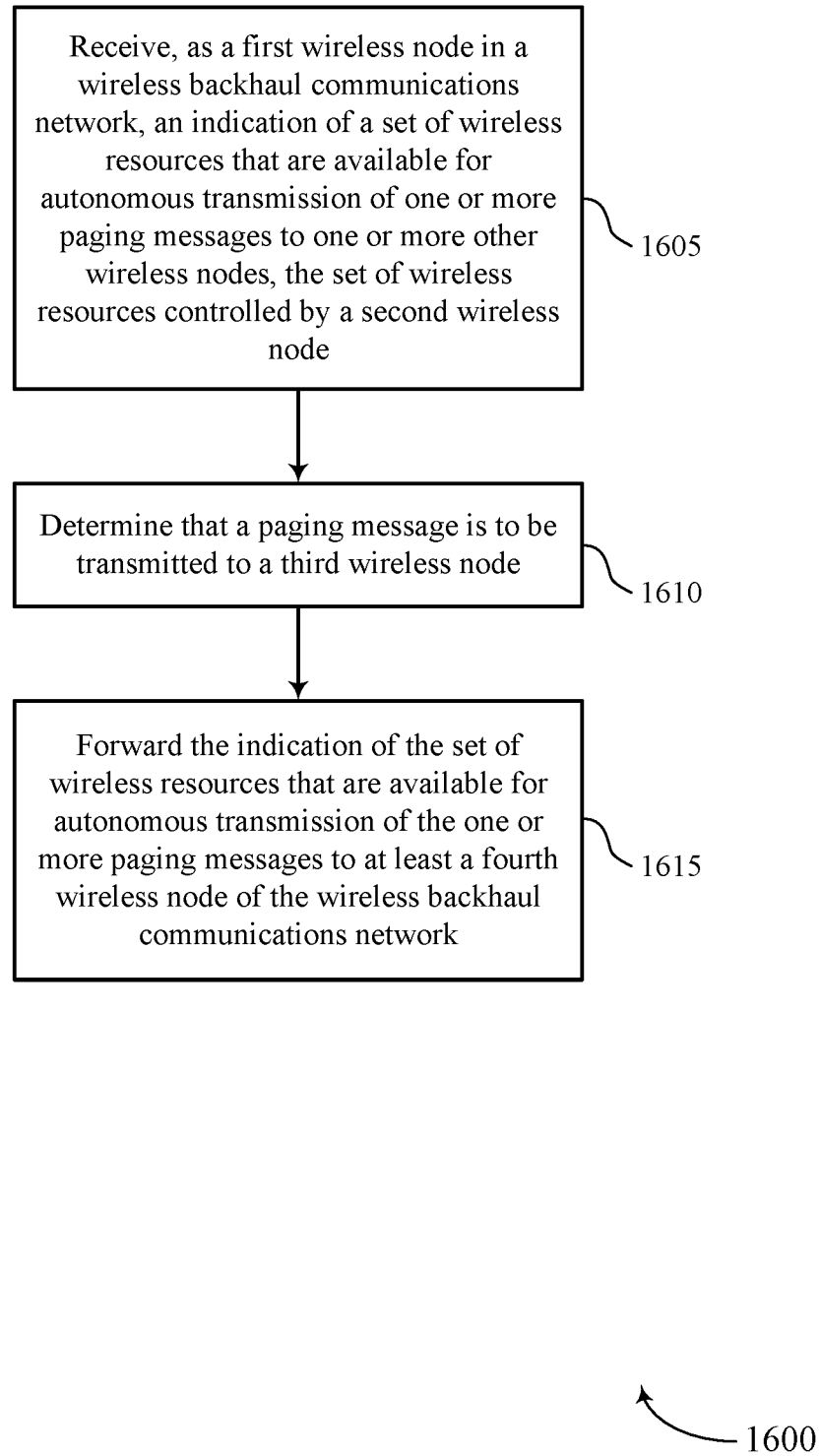

FIG. 16 shows a flowchart illustrating a method 1600 for paging techniques in a wireless backhaul network in accordance with aspects of the present disclosure. The operations of method 1600 may be implemented by a base station 105 or its components as described herein. For example, the operations of method 1600 may be performed by a base station communications manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may receive, at a first wireless node in a wireless backhaul communications network, an indication of a set of wireless resources that are available for autonomous transmission of one or more paging messages to one or more other wireless nodes, the set of wireless resources controlled by a second wireless node. The operations of 1605 may be performed according to the methods described herein. In certain examples, aspects of the operations of 1605 may be performed by a resource allocation component as described with reference to FIGS. 6 through 9.

At 1610 the base station 105 may determine that a paging message is to be transmitted to a third wireless node. The operations of 1610 may be performed according to the methods described herein. In certain examples, aspects of the operations of 1610 may be performed by a paging manager as described with reference to FIGS. 6 through 9.

At 1615 the base station 105 may forward the indication of the set of wireless resources that are available for autonomous transmission of the one or more paging messages to at least a fourth wireless node of the wireless backhaul communications network. The operations of 1615 may be performed according to the methods described herein. In certain examples, aspects of the operations of 1615 may be performed by a paging manager as described with reference to FIGS. 6 through 9.

Figure 17:
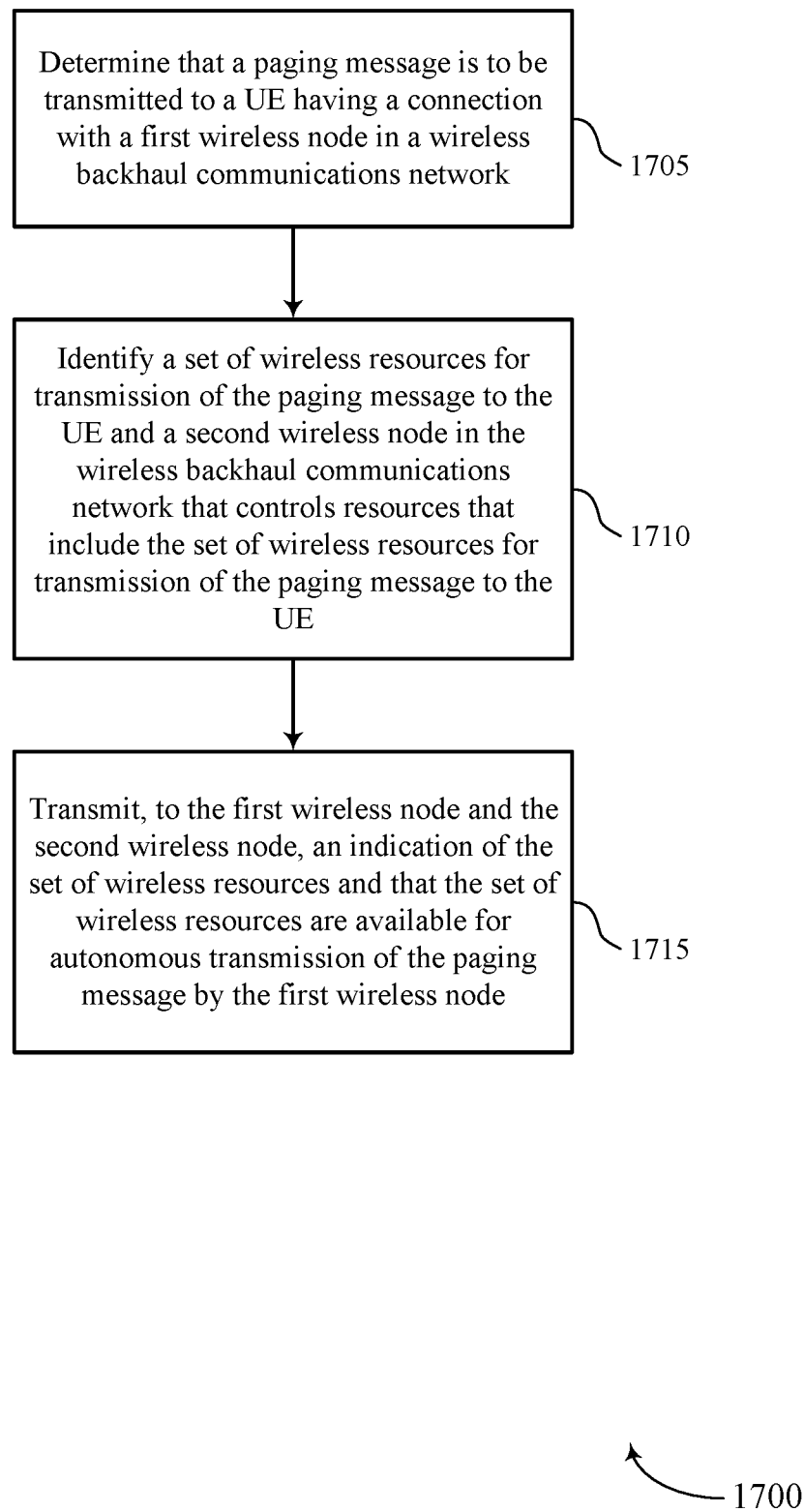

FIG. 17 shows a flowchart illustrating a method 1700 for paging techniques in a wireless backhaul network in accordance with aspects of the present disclosure. The operations of method 1700 may be implemented by a network entity or its components as described herein. For example, the operations of method 1700 may be performed by a network entity communications manager as described with reference to FIGS. 10 through 13. In some examples, a network entity may execute a set of codes to control the functional elements of the device to perform the functions described below. Additionally or alternatively, the network entity may perform aspects of the functions described below using special-purpose hardware.

At 1705 the network entity may determine that a paging message is to be transmitted to a user equipment (UE) having a connection with a first wireless node in a wireless backhaul communications network. The operations of 1705 may be performed according to the methods described herein. In certain examples, aspects of the operations of 1705 may be performed by a paging manager as described with reference to FIGS. 10 through 13.

At 1710 the network entity may identify a set of wireless resources for transmission of the paging message to the UE and a second wireless node in the wireless backhaul communications network that controls resources that include the set of wireless resources for transmission of the paging message to the UE. The operations of 1710 may be performed according to the methods described herein. In certain examples, aspects of the operations of 1710 may be performed by a resource allocation component as described with reference to FIGS. 10 through 13.

At 1715 the network entity may transmit, to the first wireless node and the second wireless node, an indication of the set of wireless resources and that the set of wireless resources are available for autonomous transmission of the paging message by the first wireless node. The operations of 1715 may be performed according to the methods described herein. In certain examples, aspects of the operations of 1715 may be performed by a paging request component as described with reference to FIGS. 10 through 13.

Figure 18:
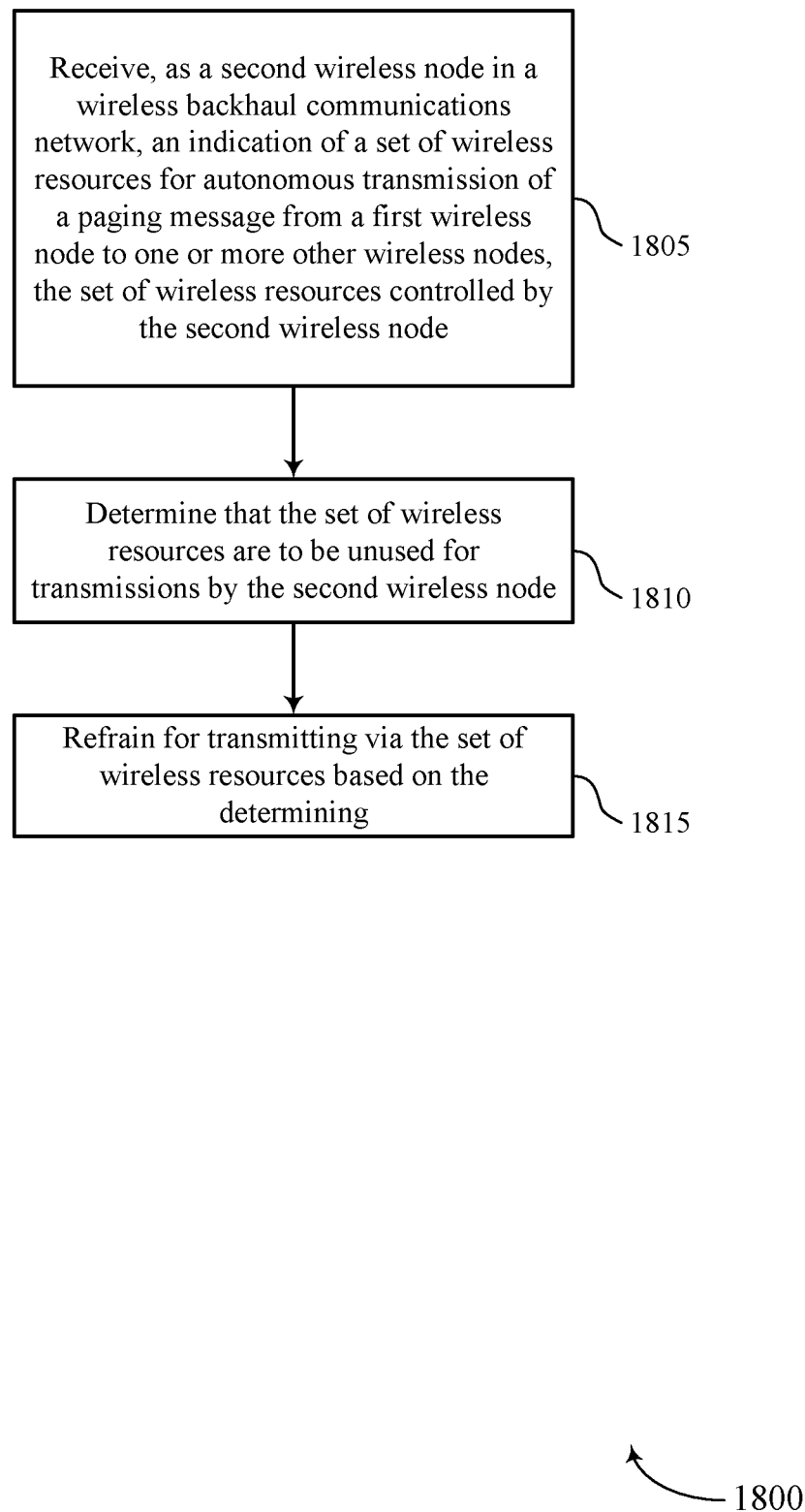

FIG. 18 shows a flowchart illustrating a method 1800 for paging techniques in a wireless backhaul network in accordance with aspects of the present disclosure. The operations of method 1800 may be implemented by a base station 105 or its components as described herein. For example, the operations of method 1800 may be performed by a base station communications manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may receive, as a second wireless node in a wireless backhaul communications network, an indication of a set of wireless resources for autonomous transmission of a paging message from a first wireless node to one or more other wireless nodes, the set of wireless resources controlled by the second wireless node. The operations of 1805 may be performed according to the methods described herein. In certain examples, aspects of the operations of 1805 may be performed by a paging manager as described with reference to FIGS. 6 through 9.

At 1810 the base station 105 may determine that the set of wireless resources are to be unused for transmissions by the second wireless node. The operations of 1810 may be performed according to the methods described herein. In certain examples, aspects of the operations of 1810 may be performed by a resource allocation component as described with reference to FIGS. 6 through 9.

At 1815 the base station 105 may refrain for transmitting via the set of wireless resources based at least in part on the determining. The operations of 1815 may be performed according to the methods described herein. In certain examples, aspects of the operations of 1815 may be performed by a resource allocation component as described with reference to FIGS. 6 through 9.

Figure 19:
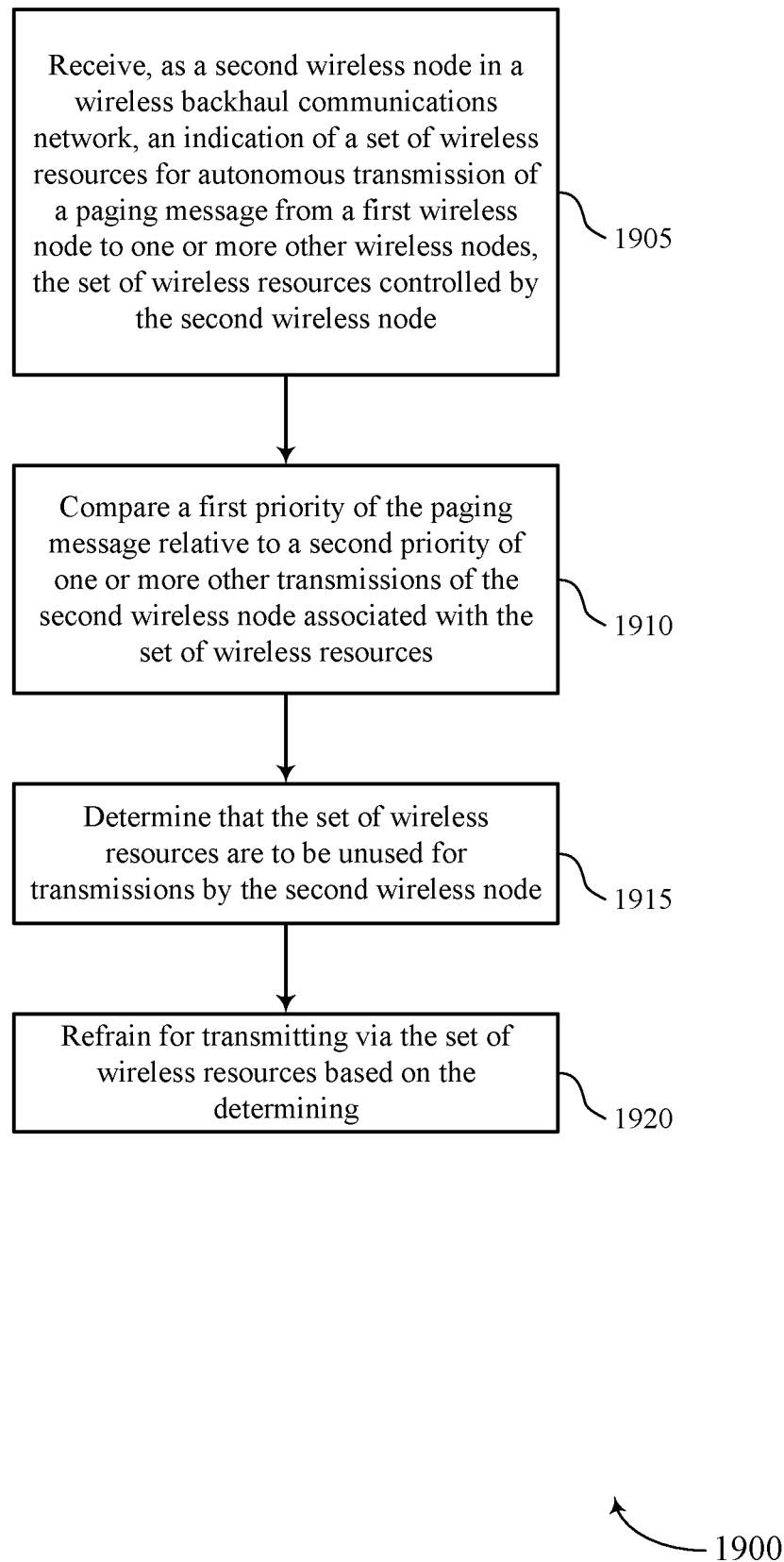

FIG. 19 shows a flowchart illustrating a method 1900 for paging techniques in a wireless backhaul network in accordance with aspects of the present disclosure. The operations of method 1900 may be implemented by a base station 105 or its components as described herein. For example, the operations of method 1900 may be performed by a base station communications manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At 1905 the base station 105 may receive, as a second wireless node in a wireless backhaul communications network, an indication of a set of wireless resources for autonomous transmission of a paging message from a first wireless node to one or more other wireless nodes, the set of wireless resources controlled by the second wireless node. The operations of 1905 may be performed according to the methods described herein. In certain examples, aspects of the operations of 1905 may be performed by a paging manager as described with reference to FIGS. 6 through 9.

At 1910 the base station 105 may compare a first priority of the paging message relative to a second priority of one or more other transmissions of the second wireless node associated with the set of wireless resources. The operations of 1910 may be performed according to the methods described herein. In certain examples, aspects of the operations of 1910 may be performed by a priority component as described with reference to FIGS. 6 through 9.

At 1915 the base station 105 may determine that the set of wireless resources are to be unused for transmissions by the second wireless node. The operations of 1915 may be performed according to the methods described herein. In certain examples, aspects of the operations of 1915 may be performed by a resource allocation component as described with reference to FIGS. 6 through 9.

At 1920 the base station 105 may refrain for transmitting via the set of wireless resources based at least in part on the determining. The operations of 1920 may be performed according to the methods described herein. In certain examples, aspects of the operations of 1920 may be performed by a resource allocation component as described with reference to FIGS. 6 through 9. In some cases, the refraining from transmitting via the set of wireless resources is based at least in part on the comparing. In some cases, the indication includes a priority indicator associated with the paging message.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless node in a wireless backhaul communications network, comprising:
   receiving an indication of a set of wireless resources that are available for autonomous transmission of one or more paging messages to one or more other wireless nodes, the set of wireless resources controlled by a second wireless node;
   determining that a paging message is to be transmitted to a third wireless node; and
   autonomously transmitting, based at least in part on the indication, the paging message to the third wireless node via the set of wireless resources controlled by the second wireless node.

2. The method of claim 1, wherein the receiving comprises receiving signaling that indicates that the paging message is to be transmitted to the third wireless node, the signaling indicating the set of wireless resources are available for autonomous transmission of the paging message.

3. The method of claim 2, wherein the signaling comprises a paging request received from a network entity of the wireless backhaul communications network according to a core network (CN) paging mode, or from a fourth wireless node of the wireless backhaul communications network according to a radio access network (RAN) paging mode.

4. The method of claim 2, wherein the signaling comprises a paging request that provides information on one or more of a user equipment identification (UE-ID) for a UE to be paged, discontinuous reception (DRX) cycle information for the UE, a number of paging frames, a number of paging opportunities, or any combinations thereof, from which the set of wireless resources that are available for autonomous transmission can be inferred.

5. The method of claim 2, wherein the signaling includes a priority indicator associated with the paging message, and wherein the transmitting the paging message is further based at least in part on the priority indicator.

6. The method of claim 1, further comprising:
determining that autonomous transmission of at least one other paging message is unavailable, the at least one other paging message to be transmitted to a fourth wireless node via the set of wireless resources controlled by the second wireless node;
transmitting a request message to the second wireless node indicating that resources are requested at the first wireless node;
receiving an indication of available resources from the second wireless node; and
transmitting the at least one other paging message to the fourth wireless node via the indicated available resources.

7. The method of claim 6, wherein the determining that autonomous transmission of the at least one other paging message is unavailable is based at least in part on a flag provided with a paging request.

8. The method of claim 6, wherein the indication that the set of wireless resources are available for autonomous transmission of the one or more paging messages is a second request message transmitted by another wireless node indicating that resources are requested for the paging message.

9. The method of claim 6, further comprising:
determining that the set of wireless resources are available for autonomous transmission of the one or more paging messages when a paging request is received from a network entity of a core network (CN) according to a CN paging mode; and
the determining that autonomous transmission of the at least one other paging message is unavailable is based on at least one other paging request received from another wireless node of the wireless backhaul communications network according to a radio access network (RAN) paging mode.

10. The method of claim 1, further comprising:
forwarding the indication of the set of wireless resources that are available for autonomous transmission of the one or more paging messages to at least a fourth wireless node of the wireless backhaul communications network.

11. The method of claim 10, wherein the indication is for a page to a user equipment in a tracking area (TA) of the first wireless node, and is forwarded to the fourth wireless node in the TA via one or more intermediary wireless nodes of the wireless backhaul communications network.

12. The method of claim 1, further comprising:
receiving information identifying at least the third wireless node and a tracking area (TA) associated with the third wireless node, wherein the first wireless node is part of the TA.

13. The method of claim 12, wherein the information further identifies that at least the second wireless node is part of the TA, and wherein the autonomously transmitting the paging message is based at least in part on the first wireless node and the second wireless node being part of the TA.

14. The method of claim 13, wherein the information further identifies that at least a fourth wireless node is not part of the TA, and wherein the method further comprises:
transmitting a request for resources to the fourth wireless node for transmission of the one or more paging messages.

15. The method of claim 12, wherein the information is received as part of a paging request received at the first wireless node or in one or more configuration messages received at the first wireless node.

16. An apparatus for wireless communication at a first wireless node in a wireless backhaul communications network, comprising:
a processor;
memory coupled with the processor; and
instructions stored in the memory and executable by the processor to cause the apparatus to:
receive an indication of a set of wireless resources that are available for autonomous transmission of one or more paging messages to one or more other wireless nodes, the set of wireless resources controlled by a second wireless node;
determine that a paging message is to be transmitted to a third wireless node; and
autonomously transmit, based at least in part on the indication, the paging message to the third wireless node via the set of wireless resources controlled by the second wireless node.

17. The apparatus of claim 16, wherein the instructions are further executable by the processor to cause the apparatus to:
receive signaling that indicates that the paging message is to be transmitted to the third wireless node, the signaling indicating the set of wireless resources are available for autonomous transmission of the paging message.

18. The apparatus of claim 17, wherein the signaling comprises a paging request received from a network entity of the wireless backhaul communications network according to a core network (CN) paging mode, or from a fourth wireless node of the wireless backhaul communications network according to a radio access network (RAN) paging mode.

19. The apparatus of claim 17, wherein the signaling comprises a paging request that provides information on one or more of a user equipment identification (UE-ID) for a UE to be paged, discontinuous reception (DRX) cycle information for the UE, a number of paging frames, a number of paging opportunities, or any combinations thereof, from which the set of wireless resources that are available for autonomous transmission can be inferred.

20. The apparatus of claim 17, wherein the signaling includes a priority indicator associated with the paging message, and wherein the transmitting the paging message is further based at least in part on the priority indicator.

21. The apparatus of claim 16, wherein the instructions are executable by the processor to:
determine that autonomous transmission of at least one other paging message is unavailable, the at least one other paging message to be transmitted to a fourth wireless node via the set of wireless resources controlled by the second wireless node;
transmit a request message to the second wireless node indicating that resources are requested at the first wireless node;
receive an indication of available resources from the second wireless node; and
transmitting the at least one other paging message to the fourth wireless node via the indicated available resources.

22. The apparatus of claim 21, wherein the determining that autonomous transmission of the at least one other paging message is unavailable is based at least in part on a flag provided with a paging request.

23. The apparatus of claim 21, wherein the indication that the set of wireless resources are available for autonomous transmission of the one or more paging messages is a second request message transmitted by another wireless node indicating that resources are requested for the paging message.

24. The apparatus of claim 21, wherein the instructions are executable by the processor to:
   determine that the set of wireless resources are available for autonomous transmission of the one or more paging messages when a paging request is received from a network entity of a core network (CN) according to a CN paging mode; and
   determine that autonomous transmission of the at least one other paging message is unavailable based on at least one other paging request received from another wireless node of the wireless backhaul communications network according to a radio access network (RAN) paging mode.

25. The apparatus of claim 16, wherein the instructions are executable by the processor to:
   forward the indication of the set of wireless resources that are available for autonomous transmission of the one or more paging messages to at least a fourth wireless node of the wireless backhaul communications network.

26. The apparatus of claim 16, wherein the instructions are executable by the processor to:
   receive information identifying at least the third wireless node and a tracking area (TA) associated with the third wireless node, wherein the first wireless node is part of the TA.

27. The apparatus of claim 26, wherein the information further identifies that at least the second wireless node is part of the TA, and wherein the autonomously transmitting the paging message is based at least in part on the first wireless node and the second wireless node being part of the TA.

28. An apparatus for wireless communication at a first wireless node in a wireless backhaul communications network, comprising:
   means for receiving an indication of a set of wireless resources that are available for autonomous transmission of one or more paging messages to one or more other wireless nodes, the set of wireless resources controlled by a second wireless node;
   means for determining that a paging message is to be transmitted to a third wireless node; and
   means for autonomously transmitting, based at least in part on the indication, the paging message to the third wireless node via the set of wireless resources controlled by the second wireless node.

29. The apparatus of claim 28, further comprising:
   means for determining that autonomous transmission of at least one other paging message is unavailable, the at least one other paging message to be transmitted to a fourth wireless node via the set of wireless resources controlled by the second wireless node;
   means for transmitting a request message to the second wireless node indicating that resources are requested at the first wireless node;
   means for receiving an indication of available resources from the second wireless node; and
   means for transmitting the at least one other paging message to the fourth wireless node via the indicated available resources.

30. A non-transitory computer-readable medium storing computer-executable code for wireless communication at a wireless device, the code executable to:
   receive an indication of a set of wireless resources that are available for autonomous transmission of one or more paging messages to one or more other wireless nodes, the set of wireless resources controlled by a second wireless node;
   determine that a paging message is to be transmitted to a third wireless node; and
   autonomously transmit, based at least in part on the indication, the paging message to the third wireless node via the set of wireless resources controlled by the second wireless node.

* * * * *